US012184837B2

United States Patent
Wang

(10) Patent No.: US 12,184,837 B2
(45) Date of Patent: Dec. 31, 2024

(54) MODIFYING A SET OF ANGLE PREDICTION MODES FOR CODING AN EQUIRECTANGULAR PROJECTION FORMAT IMAGE

(71) Applicant: Tencent Technology (Shenzhen) Company Limited, Guangdong (CN)

(72) Inventor: Yingbin Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 156 days.

(21) Appl. No.: 17/986,722

(22) Filed: Nov. 14, 2022

(65) Prior Publication Data

US 2023/0080747 A1    Mar. 16, 2023

Related U.S. Application Data

(63) Continuation of application No. PCT/CN2021/131107, filed on Nov. 17, 2021.

(30) Foreign Application Priority Data

Nov. 25, 2020    (CN) .......................... 202011340085.X

(51) Int. Cl.
  *H04N 19/105*    (2014.01)
  *H04N 19/159*    (2014.01)
  (Continued)

(52) U.S. Cl.
  CPC ......... *H04N 19/105* (2014.11); *H04N 19/159* (2014.11); *H04N 19/176* (2014.11); *H04N 19/597* (2014.11)

(58) Field of Classification Search
  None
  See application file for complete search history.

(56) References Cited

U.S. PATENT DOCUMENTS 10,284,866 B1 *    5/2019    Zhao .................... H04N 19/176
2016/0309166 A1 *    10/2016    Oh ....................... H04N 19/124
(Continued)

FOREIGN PATENT DOCUMENTS

CN    109479129 A    3/2019
CN    109792520 A    5/2019
(Continued)

OTHER PUBLICATIONS

International Search Report and Written Opinion, in PCT/CN2021/131107, mailed Feb. 17, 2022, 11 pages.

*Primary Examiner* — Jessica M Prince
(74) *Attorney, Agent, or Firm* — ArentFox Schiff LLP

(57) ABSTRACT

An image processing method includes acquiring coordinates of a pixel in a first image block, the first image block being an image block in an equirectangular projection (ERP) format corresponding to an image block in a panoramic image. The coordinates include a latitude of the panoramic image. The method further includes, when the latitude included in the coordinates is less than a first threshold or greater than a second threshold, deleting one or more angle prediction modes from a current intra prediction mode set to obtain a first intra prediction mode set. The method further includes determining a target intra prediction mode of the first image block according to the first intra prediction mode set, and performing intra prediction on the first image block using the target intra prediction mode to obtain prediction information of the first image block.

17 Claims, 11 Drawing Sheets

(51) Int. Cl.
*H04N 19/176* (2014.01)
*H04N 19/597* (2014.01)

(56) References Cited

U.S. PATENT DOCUMENTS

2019/0208200 A1* 7/2019 Galpin .................. H04N 19/593
2020/0389644 A1* 12/2020 Wang ................... H04N 19/176

FOREIGN PATENT DOCUMENTS

| CN | 110383843 A | 10/2019 |
| CN | 110545429 A | 12/2019 |
| WO | 2018060346 A1 | 4/2018 |
| WO | 2019190197 A1 | 10/2019 |

* cited by examiner

MODIFYING A SET OF ANGLE PREDICTION MODES FOR CODING AN EQUIRECTANGULAR PROJECTION FORMAT IMAGE

RELATED APPLICATIONS

This application is a continuation of International Application No. PCT/CN2021/131107, filed on Nov. 17, 2021, which claims priority to Chinese Patent Application No. 202011340085.X filed on Nov. 25, 2020. The entire disclosures of the prior applications are hereby incorporated by reference.

FIELD OF THE TECHNOLOGY

This application relates to the field of image processing technologies, including a method, a device, a storage medium, and a computer program product for processing an image.

BACKGROUND OF THE DISCLOSURE

A video compression processing technology mainly includes intra prediction, inter prediction, transform and quantization, entropy coding, deblocking filtering, and the like. In the intra prediction technology, prediction information of a current image block is from image blocks in a same image that have been coded and reconstructed.

In the related art, the intra prediction technology in the video coding standard is designed for 2D plane images. In order to compress a 360-degree panoramic image, the 360-degree panoramic image is required to be projected and transformed to a two-dimensional plane. The equirectangular projection (ERP) format is a frequently used projection format. However, the projection transformation in the ERP format easily causes distortion of image content, which has adverse effect on the intra prediction performance. An image block 110 and an image block 120 shown in FIG. 1A are two image blocks of a 360-degree panoramic image, and the two image blocks on the sphere have different areas. An image block 130 and an image block 140 shown in FIG. 1B are image blocks of the 360-degree panoramic images transformed in the ERP format, that is, 2D images corresponding to the image block 110 and the image block 120. As shown in FIG. 1A, the image block 110 and the image block 120 are stretched into image blocks with equal areas in the ERP format. The distortion is caused by inconsistent sampling rates of a latitude and a longitude of a sphere during the projection transformation.

In the intra prediction of the High Efficiency Video Coding (HEVC) standard, 33 angle prediction modes are designed, as shown in FIG. 2, which are also referred to as direction prediction modes. The 33 angle prediction modes are all used for prediction of texture structures in 2D images. However, different from the 2D images, the 360-degree panoramic image is originally presented as a sphere. Due to the above distortion, when the angle prediction modes are mapped to the sphere, the prediction directions are not uniformly distributed on the sphere. For example, angle prediction modes with an index greater than 18 are distributed more densely, while other angle prediction modes are distributed more sparsely.

SUMMARY

Embodiments of this disclosure provide a method, a device, a storage medium, and a computer program product for processing an image, which can implement a coding process of a 360-degree panoramic image.

In an embodiment, an image processing method includes acquiring coordinates of a pixel in a first image block, the first image block being an image block in an equirectangular projection (ERP) format corresponding to an image block in a panoramic image. The coordinates include a latitude of the panoramic image. The method further includes, when the latitude included in the coordinates is less than a first threshold or greater than a second threshold, deleting one or more angle prediction modes from a current intra prediction mode set to obtain a first intra prediction mode set. The method further includes determining a target intra prediction mode of the first image block according to the first intra prediction mode set, and performing intra prediction on the first image block using the target intra prediction mode to obtain prediction information of the first image block. The method further includes coding the first image block according to the prediction information to obtain a bit stream.

In an embodiment, an image processing method including parsing a bit stream to obtain indication information, the indication information comprising an index of a target intra prediction mode, and acquiring coordinates of a pixel in a first image block. The first image block is an image block in an equirectangular projection (ERP) format corresponding to an image block in a panoramic image to be reconstructed, and the coordinates include a latitude of the panoramic image. The method further includes, when the latitude included in the coordinates is less than a first threshold or greater than a second threshold, deleting one or more angle prediction modes from a current intra prediction mode set to obtain a first intra prediction mode set. The method further includes determining the target intra prediction mode according to the first intra prediction mode set and the index of the target intra prediction mode, and performing intra prediction on the first image block using the target intra prediction mode to obtain prediction information of the first image block. The method further includes reconstructing the first image block according to the prediction information.

In an embodiment, an image processing apparatus includes processing circuitry configured to acquire coordinates of a pixel in a first image block, the first image block being an image block in an equirectangular projection (ERP) format corresponding to an image block in a panoramic image. The coordinates include a latitude of the panoramic image. The processing circuitry is further configured to, when the latitude included in the coordinates is less than a first threshold or greater than a second threshold, delete one or more angle prediction modes from a current intra prediction mode set to obtain a first intra prediction mode set. The processing circuitry is further configured to determine a target intra prediction mode of the first image block according to the first intra prediction mode set, and perform intra prediction on the first image block using the target intra prediction mode to obtain prediction information of the first image block. The processing circuitry is further configured to code the first image block according to the prediction information to obtain a bit stream.

The embodiments of this disclosure are performed on the image block in the ERP format corresponding to the to-be-coded image block in the panoramic image. In a case that the image block in the ERP format is distorted, a strong transverse correlation exists at a high latitude of the panoramic image. Therefore, deleting partial angle prediction modes from the current intra prediction mode set is equivalent to deleting partial angle prediction modes in the to-be-coded image block distributed relatively densely, so that the effect of image coding can be improved.

DESCRIPTION OF EMBODIMENTS

The technical solutions in the embodiments of this disclosure are described below with reference to the accompanying drawings in the embodiments of this disclosure. The described embodiments are merely some rather than all of the embodiments of this disclosure. All other embodiments obtained by a person skilled in the art based on the embodiments of this disclosure shall fall within the protection scope of this disclosure.

In the specification, claims, and accompanying drawings of this disclosure, the terms "first", "second", and so on are intended to distinguish between similar objects but do not necessarily indicate a specific order or sequence. It is to be understood that the data used in such a way is interchangeable in proper circumstances, so that the embodiments of this disclosure described herein can be implemented in other sequences than the sequence illustrated or described herein. Moreover, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

Before description of the technical solutions of this disclosure, image or video coding and decoding frameworks, an image block partition manner, most probable modes (MPM) and an equirectangular projection (ERP) format are first described below.

I. Image or Video Coding and Decoding Frameworks

Figure 3:
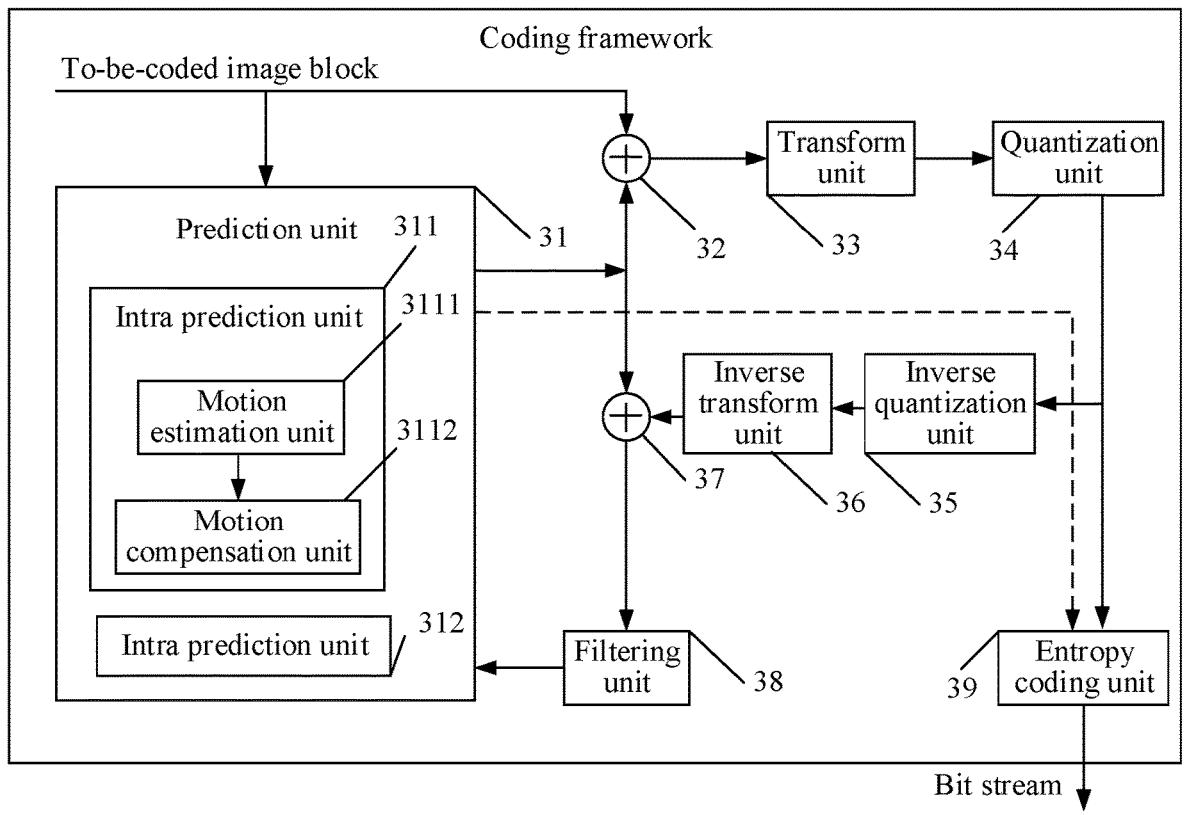
FIG. 3 is a schematic diagram of a coding framework according to an embodiment of this disclosure.

Exemplarily, FIG. 3 is a schematic diagram of a coding framework according to an embodiment of this disclosure. As shown in FIG. 3, the coding framework includes a prediction unit 31, a residual generation unit 32, a transform unit 33, a quantization unit 34, an inverse quantization unit 35, an inverse transform unit 36, a reconstruction unit 37, a filtering unit 38, and an entropy coding unit 39. The prediction unit 31 includes an inter prediction unit 311 and an intra prediction unit 312. The inter prediction unit 311 includes a motion estimation unit 3111 and a motion compensation unit 3112.

After a coder side receives a video, each frame of image constituting the video is partitioned into a plurality of to-be-coded image blocks. The prediction unit 31 first performs prediction on a current to-be-coded image block by referring to a reconstructed image block, to obtain prediction information of the current to-be-coded image block. The coder side may obtain the prediction information by using an inter prediction or intra prediction technology.

For example, in a case that the inter prediction technology is used, the motion estimation unit 3111 in the inter prediction unit 311 may search reference pictures in a reference picture list for a reference block of the to-be-coded image block. The motion estimation unit 3111 may generate an index indicating the reference block and a motion vector indicating a spatial displacement between the to-be-coded image block and the reference block. The motion estimation unit 3111 may output the index of the reference block and the motion vector as motion information of the to-be-coded image block. The motion compensation unit 3112 may obtain prediction information of the to-be-coded image block based on the motion information of the to-be-coded image block.

Figure 1A:
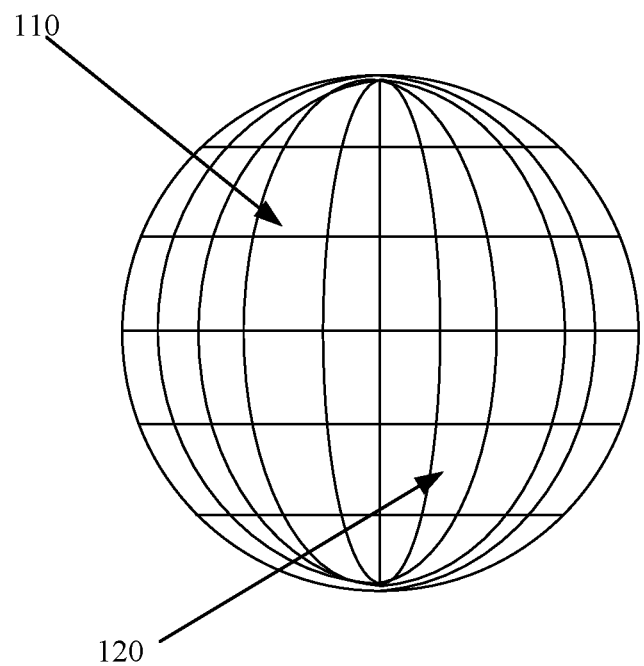
FIG. 1A is a schematic diagram of a 360-degree panoramic image according to an embodiment of this disclosure.
Figure 1B:
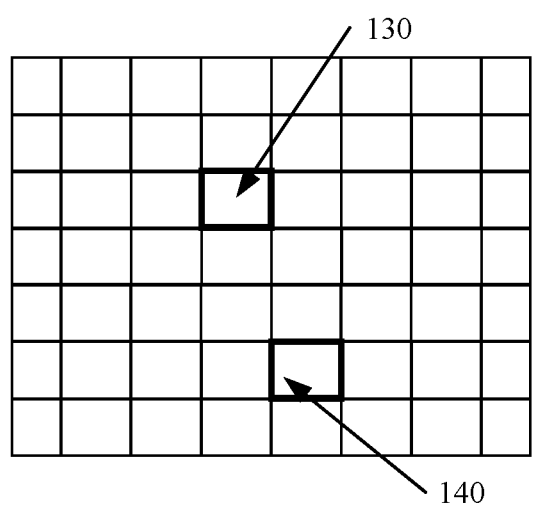
FIG. 1B is a schematic diagram of an ERP format image corresponding to the 360-degree panoramic image according to an embodiment of this disclosure.
Figure 2:
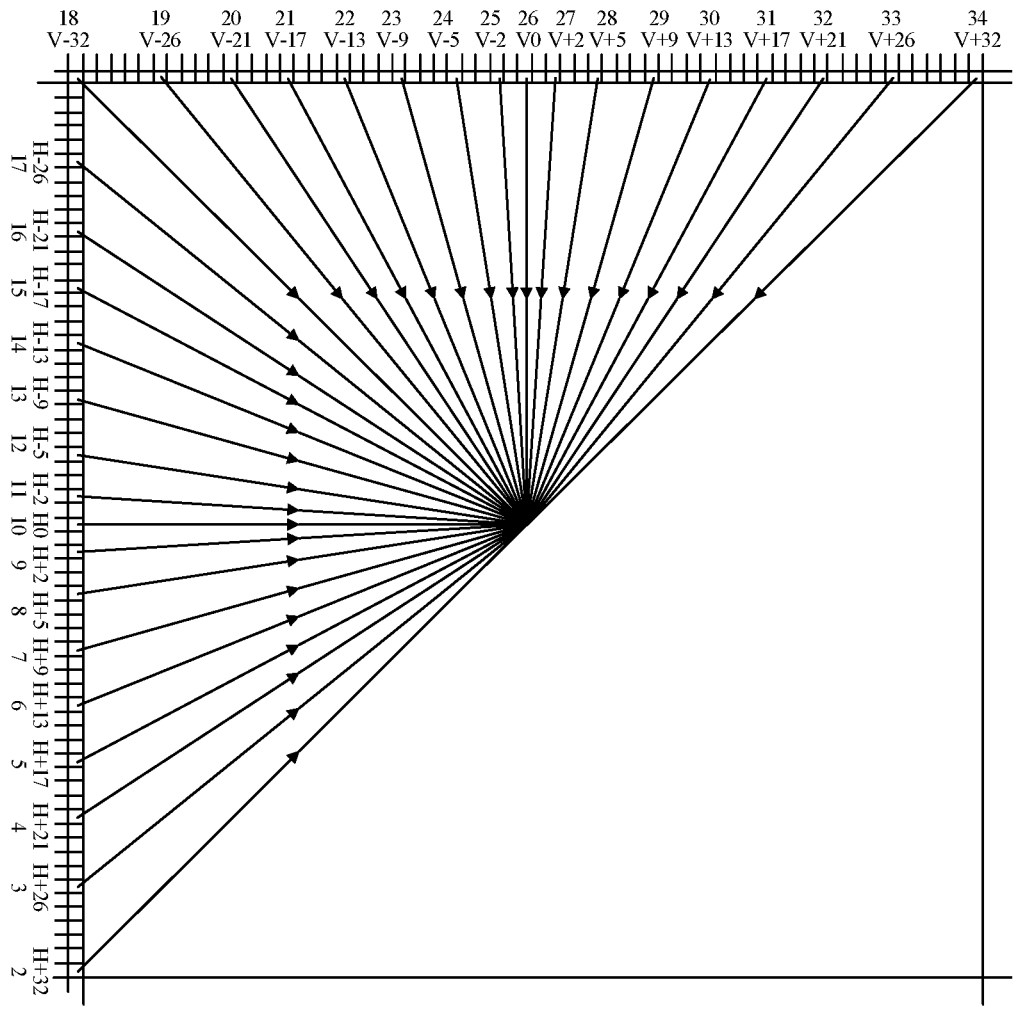
FIG. 2 is a schematic diagram of an intra prediction mode according to an embodiment of this disclosure.

For example, in a case that the intra prediction technology is used, the intra prediction unit 312 may generate prediction information for the to be current to-be-coded image block in an intra prediction mode. This embodiment of this disclosure includes 35 intra prediction modes, including a planar mode, a DC mode, and 33 angle prediction modes. All of the prediction modes use a same reference pixel template. As shown in FIG. 2, the 33 angle prediction modes are classified into a horizontal mode (with indexes of 2-17) and a vertical mode (with indexes of 18-34). V0 (with an index of 26) and H0 (with an index of 10) respectively represent the vertical direction and the horizontal direction. Prediction directions of all of the angle prediction modes may be considered as an angular offset from the vertical or horizontal direction. The vertical direction V0 (with the index of 26) is used as an example to describe an angle prediction process. The vertical direction prediction means predicting the to-be-coded image block by using a row of reference pixels adjacent to and above the current to-be-coded image block. That is to say, prediction information of each pixel in the current to-be-coded image block is equal to a pixel value of a reference pixel corresponding to a column where the pixel is located. In a case that the other angle prediction modes are used, an angular offset from the horizontal or vertical direction is generated, and a position of the reference pixel may be calculated according to the angular offset. The position of the reference pixel may be a position between two adjacent reference pixels. In this case, a reference pixel between the two reference pixels is required to be obtained by interpolating according to the calculated position. The prediction information is generated through the obtained reference pixel.

The residual generation unit 32 is configured to subtract the prediction information from an original signal of the current to-be-coded image block to obtain a residual signal. A magnitude of the residual signal is much less than that of the original signal after prediction. The transform unit 33 and the quantization unit 34 are configured to transform and quantize the residual signal. After the transform and the quantization, a transform and quantization coefficient is obtained. The entropy coding unit 39 is configured to code the transform and quantization coefficient and other indication information through an entropy coding technology to obtain a bit stream.

In some embodiments, the coder side further needs to reconstruct the current to-be-coded image block, so as to provide reference pixels for coding of subsequent to-be-coded image blocks. For example, after obtaining the transform and quantization coefficient of the current to-be-coded image block, the inverse quantization unit 35 and the inverse transform unit 36 respectively perform inverse quantization and inverse transform on the transform and quantization coefficient of the current to-be-coded image block, obtain a reconstructed residual signal. The reconstruction unit 37 adds up the reconstructed residual signal and the prediction information corresponding to the current to-be-coded image block to obtain a reconstructed signal of the current to-be-coded image block, and obtains a reconstructed image block according to the reconstructed signal. The filtering unit 38 may filter the reconstructed image block through deblocking filtering, sample adaptive offset (SAO), adaptive loop filter (ALF), or the like. The reconstructed image block may be used for predicting the subsequent to-be-coded image blocks.

Figure 4:
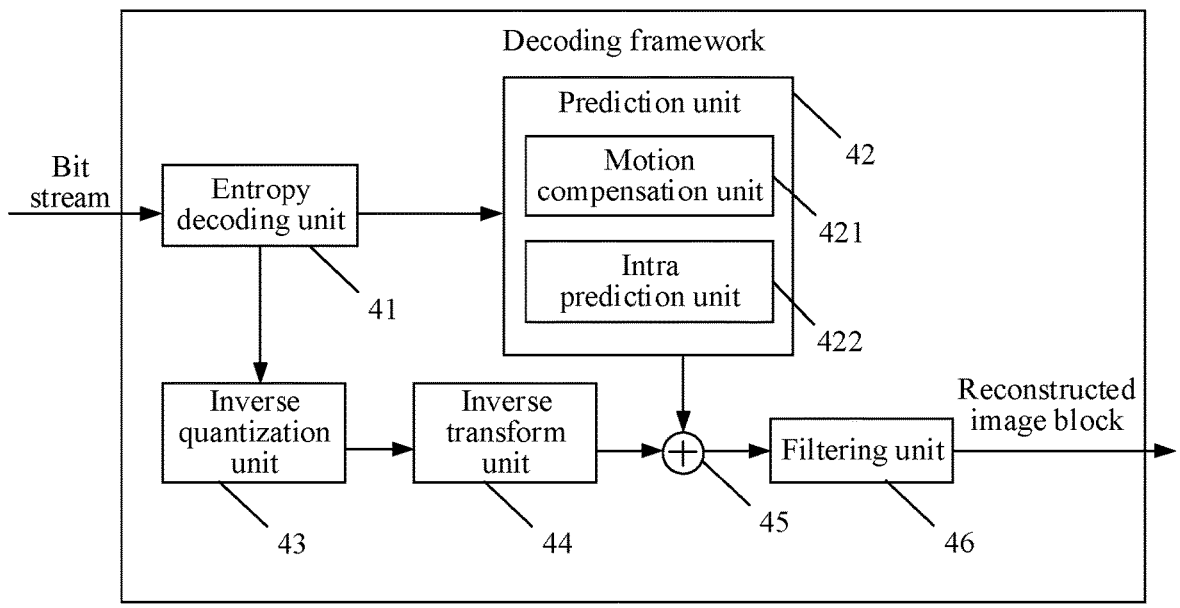
FIG. 4 is a schematic diagram of a decoding framework according to an embodiment of this disclosure.

Exemplarily, FIG. 4 is a schematic diagram of a decoding framework according to an embodiment of this disclosure. As shown in FIG. 4, the decoding framework includes an entropy decoding unit 41, a prediction unit 42, an inverse quantization unit 43, an inverse transform unit 44, a reconstruction unit 45, and a filtering unit 46. The prediction unit 42 includes a motion compensation unit 421 and an intra prediction unit 422.

In some embodiments, after obtaining the bit stream, a decoder side first performs entropy decoding on the bit stream through the entropy decoding unit 41, to obtain a transform and quantization coefficient of a current to-be-reconstructed image block. Then the inverse quantization unit 43 and the inverse transform unit 44 respectively perform inverse quantization and inverse transform on the transform and quantization coefficient to obtain a reconstructed residual signal of the current to-be-reconstructed image block. The prediction unit 42 performs prediction on the current to-be-reconstructed image block to obtain prediction information of the current to-be-reconstructed image block. If prediction unit 42 selects the inter prediction, the motion compensation unit 421 may construct a first reference picture list (a list 0) and a second reference picture list (a list 1) according to syntax elements parsed from the bit stream. In addition, the entropy decoding unit 41 may parse motion information of the to-be-reconstructed image block. The motion compensation unit 421 may determine one or more reference blocks of the to-be-reconstructed image block according to the motion information. The motion compensation unit 421 may generate the prediction information of the to-be-reconstructed image block according to the one or more reference blocks. If the prediction unit 42 selects the intra prediction, the entropy decoding unit 41 may parse an index of the intra prediction mode that is used, and the intra prediction unit 422 may perform intra prediction in the intra prediction mode according to the index to obtain the prediction information of the to-be-reconstructed image block.

The reconstruction unit 45 is configured to add up the prediction information and the reconstructed residual signal to obtain a reconstructed signal of the current to-be-reconstructed image block, and then obtain a current reconstructed image block corresponding to the current to-be-reconstructed image block according to the reconstructed signal. The current reconstructed image block may be used for predicting other subsequent to-be-reconstructed image blocks. Similar to the above operation performed by the coder side, the filtering unit 46 at the decoder side may filter the current reconstructed image block.

II. Image Block Partition Manner

In a hybrid coding framework based on block partition, an image is partitioned into a plurality of non-overlapping to-be-processed units for video compression. Each to-be-processed unit is referred to as a coding tree unit (CTU). The CTU may be further partitioned to obtain one or more basic coding units (CU), which are referred to as CUs. Each CU is the most basic element in a coding process. Each CU may adopt a different coding mode.

Figure 5:
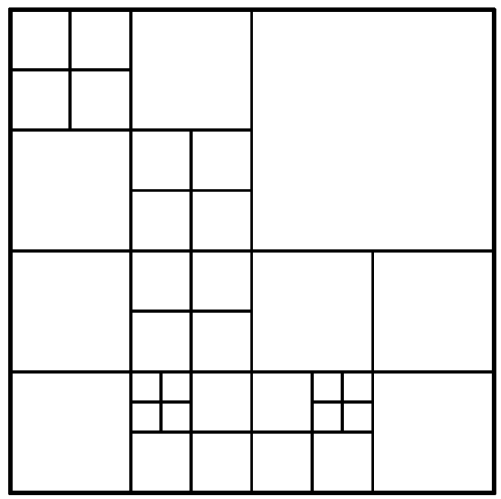
FIG. 5 is a schematic diagram of a block partition structure in the HEVC standard.
Figure 6:
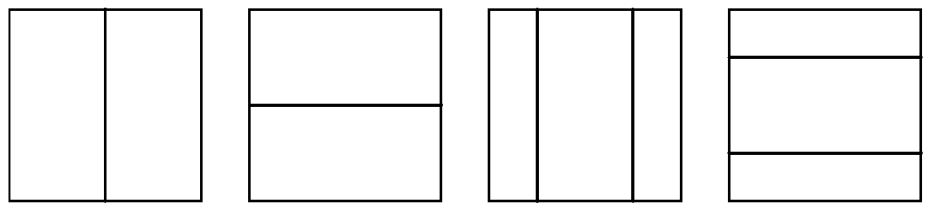
FIG. 6 is a schematic diagram of binary tree partition and ternary tree partition according to an embodiment of this disclosure.

FIG. 5 is a schematic diagram of a block division structure in the HEVC standard. A CTU may be further partitioned according to a quadtree. Versatile video coding (VVC)/H.266 coding introduces more partition manners for the partition structure of the CTU. In addition to the quadtree partition, binary tree partition and ternary tree partition may be used. As shown in FIG. 6, the first two pictures on the left show the binary tree partition, and the latter two pictures on the right show the ternary tree partition.

In this embodiment of this disclosure, an image block in a 2D image may be the above CTU, the above CU, a prediction unit (PU), or a transform unit (TU), which may be based on quadtree, ternary tree, or a binary tree. This is not limited in this embodiment of this disclosure.

III. MPM

In order to improve the coding efficiency of the intra prediction mode, the HEVC derives three MPMs of the current to-be-coded image block or to-be-reconstructed image block according to intra prediction modes of image blocks adjacent to the current to-be-coded image block or to-be-reconstructed image block. Table 1 summarizes methods for deriving the MPMs. A and B respectively represent the intra prediction modes of adjacent image blocks on the left of and above the current to-be-coded image block or to-be-reconstructed image block. Values of $A^-$ and $A^+$ are calculated according to a formula (1):

$$A^-=2+((A+29) \bmod 32)$$

$$A^+=2+((A-1) \bmod 32) \qquad (1).$$

If the intra prediction mode of the current to-be-coded image block is one of the MPMs, the index of the intra prediction mode in the MPM is coded. Otherwise, the index of the intra prediction mode in the remaining 33 prediction modes is coded.

TABLE 1

| Solution | Condition | MPMs | | |
|---|---|---|---|---|
| | | 1 | 2 | 3 |
| 1 | A = B∧A < 2 | 0 | 1 | 26 |
| 2 | A = B∧A ≥ 2 | A | A⁻ | A⁺ |
| 3 | A ≠ B∧A > 0∧B > 0 | A | B | 0 |
| 4 | A ≠ B∧(A = 0∨B = 0)∧A + B < 2 | A | B | 1 |
| 5 | A ≠ B∧(A = 0∨B = 0)∧A + B ≥ 2 | A | B | 26 |

IV. ERP Format

Figure 7A:
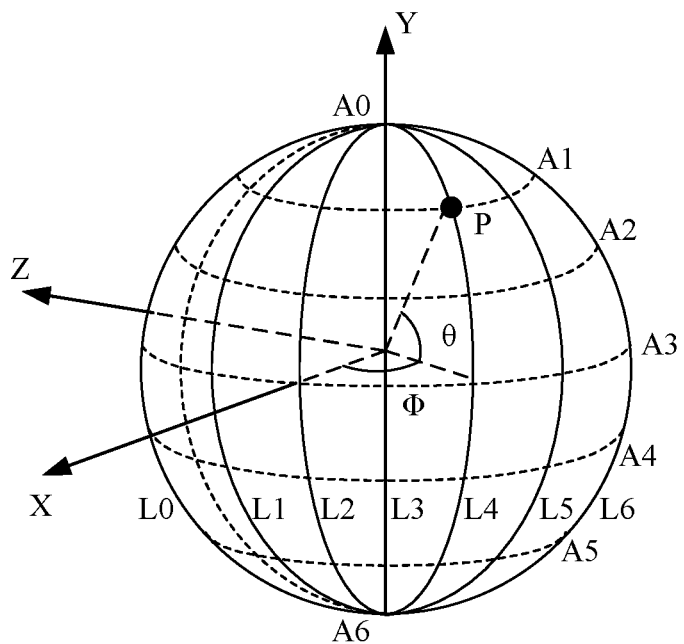
FIG. 7A is a schematic diagram of a spherical coordinate conversion system according to an embodiment of this disclosure.
Figure 7B:
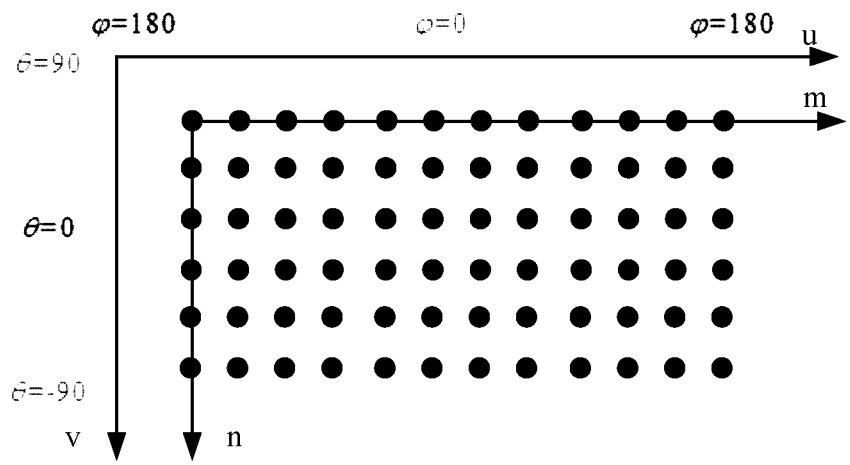
FIG. 7B is a schematic diagram of a planar coordinate conversion system according to an embodiment of this disclosure.

The video coding standards in the related art are all designed for 2D plane videos. In order to compress a 360-degree panoramic image through these video coding standards, the 360-degree panoramic image is required to be projected and transformed to a 2D plane. The ERP format is a projection format. As shown in FIG. 7A and FIG. 7B, ERP provides simple mapping of a 3D sphere to a 2D plane.

As shown in FIG. 7A, a point P is assumed on the sphere. Coordinates of the point P in a spherical coordinate system are expressed as (r, φ, θ), and coordinates of the point in a 3D rectangular coordinate system are expressed as (x, y, z). The spherical coordinate system may be transformed into the 3D rectangular coordinate system according to a formula (2):

$$x = r \cos(\theta)\cos(\varphi)$$

$$y = r \sin(\theta)$$

$$z = -r \cos(\theta)\sin(\varphi) \quad (2).$$

Two 2D planar coordinate systems are defined in FIG. 7B. An m-n coordinate system is a coordinate system of an image sampling point, m and n being respectively column coordinates and row coordinates of the sampling position. A u-v coordinate system is a projected planar coordinate system. FIG. 7B shows sampling coordinates defined for the ERP in a UV plane. Circles are the sampling points. In a 360-degree panoramic image, in order to arrange all of the sampling points symmetrically in two directions, an origin of the u-v coordinate system is offset from an origin of the m-n coordinate system by 0.5 pixels. A transform relationship between the u-v coordinate system and the m-n coordinate system is shown as a formula (3):

$$u = (m+0.5)/W, 0 \leq m < W$$

$$v = (n+0.5)/H, 0 \leq n < H \quad (3).$$

According to the ERP, a latitude line and a longitude line on the 3D sphere are respectively mapped to a row and a column of a 2D image. Spherical coordinates corresponding to 2D planar coordinates (u, v) are calculated according to a formula (4):

$$\varphi = (u-0.5)*2\pi$$

$$\theta = (0.5-v)*\pi \quad (4).$$

As described above, different from the 2D image, the 360-degree panoramic image is originally presented as a sphere. Due to distortion caused by the transform of the 360-degree panoramic image in the ERP format, when the angle prediction modes are mapped to the sphere, the prediction directions are not uniformly distributed on the sphere. For example, angle prediction modes with an index greater than 18 are distributed more densely, while other angle prediction modes are distributed more sparsely. In particular, for an image block located at a latitude greater than π/3, a horizontal sampling rate of an adjacent pixel above the image block is twice a vertical sampling rate of a pixel on the left of the image block. Therefore, the non-uniform distribution of the angle prediction modes is more obvious. In this case, how to perform image coding and decoding is a technical problem urgently to be resolved in the embodiments of this disclosure.

In order to resolve the above technical problem, an embodiment of this disclosure provides an image processing method, which can adaptively adjust the distribution of the intra prediction modes based on the characteristics of the 360-degree panoramic image.

The image processing method provided in the embodiments of this disclosure may be implemented by a terminal/server alone, or may be jointly implemented by the terminal and the server. For example, after capturing a to-be-coded image (an original image), the terminal performs the image processing method described below alone, that is, performs coding to obtain a corresponding bit stream (a to-be-decoded bit stream) and stores the bit stream. When the original image is required to be presented, the terminal decodes the to-be-decoded bit stream by using the image processing method described below, and presents the original image. After capturing a to-be-coded image, a terminal A (a coder side) performs the image processing method described below on the original image, that is, codes the original image to obtain a corresponding bit stream (a to-be-decoded bit stream), and transmits the to-be-decoded bit stream the server (a decoder side). The server decodes the to-be-decoded bit stream, and transmits the original image obtained by decoding to a terminal B for presentation.

The electronic device provided in the embodiments of this disclosure for implementing the image processing method described below may be various types of terminals or servers. The server may be an independent physical server, or may be a server cluster or a distributed system including a plurality of physical servers, or may be a cloud server that provides cloud computing services. The terminal may be a smartphone, a tablet computer, a notebook computer, a desktop computer, a smart speaker, a smart watch, or the like, and is not limited thereto. The terminal and the server may be directly or indirectly connected in a wired or wireless communication manner. This is not limited in this embodiment of this disclosure.

In order to describe the method provided in the embodiments of this disclosure more effectively, an application scenario example is described below.

Figure 7C:
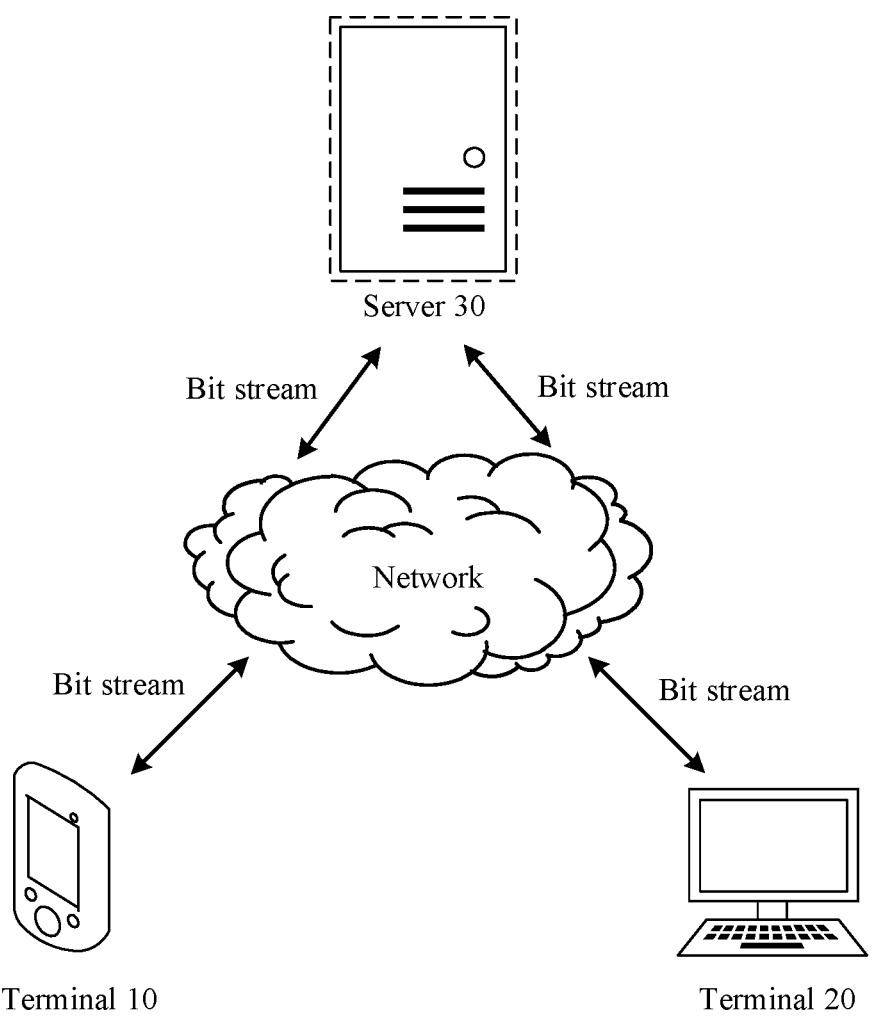
FIG. 7C is a schematic structural diagram of a video call system according to an embodiment of this disclosure.

FIG. 7C is a schematic structural diagram of a video call system in this example. As shown in FIG. 7C, the video call system may include a terminal 10 and a terminal 20, and the terminal 10 and the terminal 20 are communicatively connected through a server 30. As shown in FIG. 7C, the terminal 10 and the terminal 20 are communicatively connected to the server 30 through a network. Specifically, the terminal 10 and the terminal 20 may be call devices such as a mobile phone or a computer.

Practical application of the image processing method provided in the embodiments of this disclosure is described based on the video call system shown in FIG. 7C in combination with a specific application scenario.

When a video call is initiated, the terminal 10 and the terminal 20 are connected by the server 30. For example, the terminal 10 and the terminal 20 are both smartphones. A user A participating the video call (corresponding to the terminal 10) may initiate a video call request to a smartphone of a user B (corresponding to the terminal 20) through the smartphone. After the user B accepts the request, communication is established between the two users.

During the video call after the communication is successfully established, the terminal 10 performs image coding. For example, after capturing a to-be-coded video (an original video) through a camera, the terminal codes each frame of the image in the to-be-coded video by using the image processing method provided in the embodiments of this disclosure, and transmits a bit stream obtained by the coding to the terminal 20 through the server 30. The terminal 20 decodes the received bit stream by using the image processing method provided in the embodiments of this disclosure to reconstruct the video, and plays the reconstructed video to the user B through an image playback device.

Similarly, the user B may capture a video through a camera of the terminal 20 and code the video, and then transmit the video to the terminal 10 through the server 30. The terminal 20 reconstructs and plays the video based on details of the bit stream included in the received bit stream.

In some embodiments, the image processing method may be further applied to, but not limited to, scenarios such as video calls and live video streaming.

The terminal may include various applications, for example, an on-line education application, an instant messaging application, a community space application, a game application, a shopping application, a browser application, a financial application, a multimedia application, and a live streaming application.

The technical solution of this embodiment of this disclosure is described in detail in the following.

Figure 8:
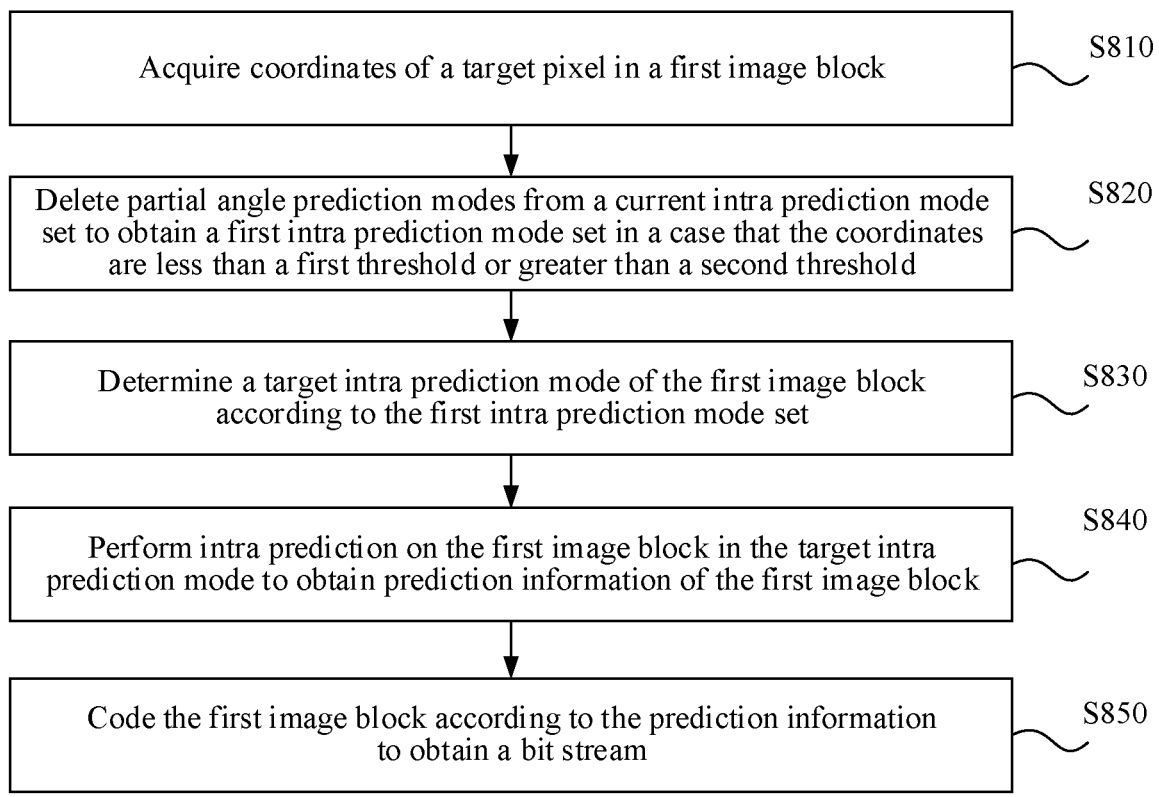
FIG. 8 is a flowchart of an image processing method according to an embodiment of this disclosure.

FIG. 8 is a flowchart of an image processing method according to an embodiment of this disclosure. The execution entity of the method may be the following terminal or server, but this disclosure is not limited thereto. An encoder is a device configured to perform video or image encoding, including a desktop computer, a mobile computing apparatus, a notebook (for example, laptop) computer, a tablet computer, a set-top box, a handset such as a smartphone, a television, a camera, a display apparatus, a digital media player, a video game console, an in-vehicle computer, or similar apparatuses. As shown in FIG. 8, the method includes the following steps:

S810: Acquire coordinates of a target pixel in a first image block.

S820: Delete partial angle prediction modes from a current intra prediction mode set to obtain a first intra prediction mode set in a case that the coordinates are less than a first threshold or greater than a second threshold. For example, when the latitude included in the coordinates is less than a first threshold or greater than a second threshold, one or more angle prediction modes are deleted from a current intra prediction mode set to obtain a first intra prediction mode set.

S830: Determine a target intra prediction mode of the first image block according to the first intra prediction mode set.

S840: Perform intra prediction on the first image block in the target intra prediction mode to obtain prediction information of the first image block.

S850: Code the first image block according to the prediction information to obtain a bit stream.

It is to be understood that the first image block is an image block in an ERP format corresponding to a to-be-coded image block in a 360-degree panoramic image. The coordinates of the target pixel include a first coordinate and a second coordinate. When the second coordinate is less than the first threshold or the second coordinate is greater than the second threshold, partial angle prediction modes are deleted from the current intra prediction mode set to obtain the first intra prediction mode set. The first coordinate corresponds to a longitude of the 360-degree panoramic image, and the second coordinate corresponds to a latitude of the 360-degree panoramic image. For example, the first coordinate is a coordinate of the target pixel of the first image block on a u-axis in the u-v coordinate system shown in FIG. 7B, and the second coordinate is a coordinate on a v-axis of the target pixel of the first image block in the u-v coordinate system shown in FIG. 7B. Alternatively, the first coordinate is a coordinate of the to-be-coded image block on an m-axis in the m-n coordinate system shown in FIG. 7B, and the second coordinate is a coordinate of the to-be-coded image block on an n-axis in the m-n coordinate system shown in FIG. 7B.

In an example, coordinates of a target pixel in an upper left corner of a current block (that is, the first image block) are (u, v), and the first threshold is preset as T1. When v<=T1, an intra prediction angle of the current block is adjusted. That is to say, partial angle prediction modes are deleted from the current intra prediction mode set to obtain the first intra prediction mode set. The coordinates of the target pixel in the upper left corner of the current block are (u, v), and the second threshold is preset as T2. When v>=T2, the intra prediction angle of the current block is adjusted. That is to say, partial angle prediction modes are deleted from the current intra prediction mode set to obtain the first intra prediction mode set.

It is to be understood that the to-be-coded image block in the 360-degree panoramic image is a 3D image block. The first image block is a 2D image block. The first image block may be the above CTU, the above CU, a PU, a TU, or the like, but is not limited thereto.

Chroma sampling is a compression encoding manner such as in a television system, luminance-chrominance-chrominance (YUV) color coding is mostly used and is a standard widely used in a European television system. A YUV color space includes a luminance signal Y and two color difference signals U and V (that is, a color-difference signal U and a color-difference signal V). The three components are independent of each other. A representation manner in which YUV color modes are separate from each other is more flexible, occupies a small quantity of bandwidth for transmission, and is advantageous over a red green blue (RGB) color model. For example, a YUV 4:2:0 form indicates that two chrominance components U and V together account for only half a luminance component Y in both horizontal and vertical directions, that is, four sampling pixel points have four luminance components Y and only one chrominance component U and one chrominance component V. Therefore, the above first image block may be a luminance block or a chrominance block. That is to say, the technical solution in this embodiment of this disclosure is applicable to the chrominance block or the luminance block, or is applicable to both the chrominance block and the luminance block. This is not limited in this embodiment of this disclosure.

In some embodiments, the target pixel may be any pixel in the first image block, for example, may be any one of but is not limited to an upper left corner pixel, a center pixel, an upper right corner pixel, a lower left corner pixel, or a lower right corner pixel in the first image block.

In some embodiments, the above first threshold and second threshold may be predetermined, or may be dynamically set. This is not limited in this embodiment of this disclosure.

In some embodiments, the above first threshold and second threshold are described with reference to FIG. 7A and FIG. 7B. The first threshold may be a value on the v-coordinate axis corresponding to any latitude greater than or equal to $\pi/3$. The second threshold may be a value on the v-coordinate axis corresponding to any latitude less than or equal to $-\pi/3$. After mapping to the sphere, for an image block on the sphere close to a top or a bottom, partial angle prediction modes are required to be deleted from the current intra prediction mode set.

Figure 9:
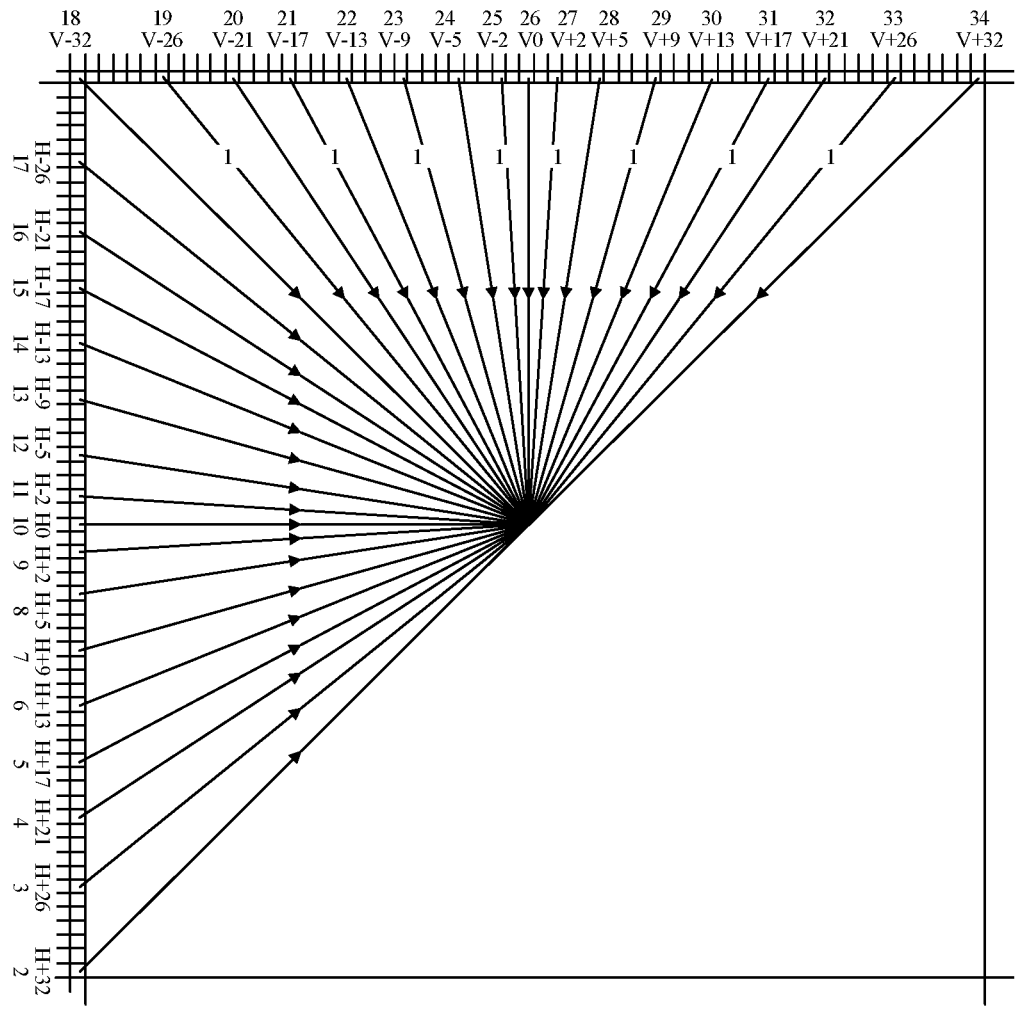
FIG. 9 is a schematic diagram of a first intra coding mode set according to an embodiment of this disclosure.

It is to be understood that, as described above, due to distortion caused by the transform of the 360-degree panoramic image in the ERP format, when the angle prediction modes are mapped to the sphere, the prediction directions are not uniformly distributed on the sphere. For example, in the HEVC standard, angle prediction modes with an index greater than 18 are distributed more densely, while other angle prediction modes are distributed more sparsely. Therefore, the angle prediction modes with indexes greater than 18 may be deleted, that is, partial (i.e., some or all) vertical angle prediction modes may be deleted. Certainly, for an image block on the sphere closer to the top or the top position, partial horizontal angle prediction modes may be deleted. Alternatively, partial vertical angle prediction modes and partial horizontal angle prediction modes may be deleted. As shown in FIG. 9, lines where a number 1 is located represent the deleted angle prediction modes, which are located on the v-coordinate axis shown in FIG. 9, that is, the coordinate axis corresponding to the second coordinate. Therefore, the distribution density of the angle prediction modes with indexes greater than 18 is reduced. In addition, a strong transverse correlation exists at a high latitude of a 360-degree panoramic image, that is to say, image blocks at a same latitude have similar textures, and therefore, deleting a part or all of the angle prediction modes with an index greater than 18 (that is, deleting the vertical angle prediction modes) has little effect on the image coding performance. Since the image block on the sphere closer to the top or the top is very narrow in the latitude direction, deleting partial horizontal angle prediction modes or deleting partial vertical angle prediction modes and partial horizontal angle prediction modes has little effect on the coding performance. Instead, since the intra prediction modes of the first image block are reduced, the image coding efficiency can be improved.

In this embodiment of this disclosure, the intra prediction modes in the current intra prediction mode set may be deleted in the following manner, but this disclosure is not limited thereto. angle prediction modes with odd or even indexes, first N angle prediction modes, or last N angle prediction modes may be deleted from the current intra prediction mode set. In the HEVC, N is a positive integer less than or equal to 17.

It is to be understood that, the current intra prediction mode set is an intra prediction mode set before the intra prediction modes are adjusted during current coding. The current intra prediction mode set may be a set composed of the above 35 intra prediction modes (including the planar mode, the DC mode, and the 33 angle prediction modes).

In some embodiments, the coder side may select one intra prediction mode from the first intra prediction mode set as the target intra prediction mode. Alternatively, at least one angle prediction mode is added to the first intra prediction mode set to obtain a second intra prediction mode set.

Figure 10:
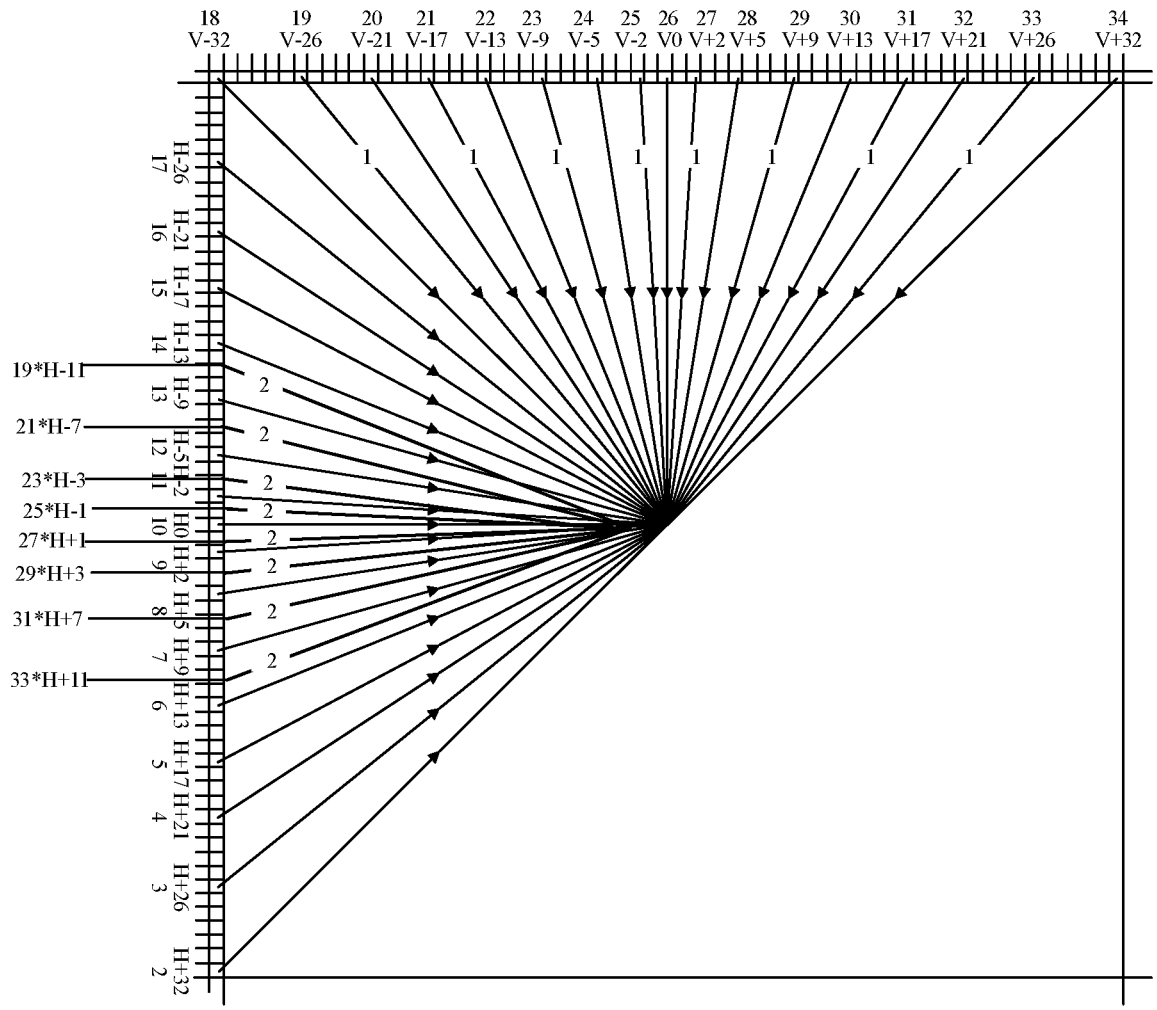
FIG. 10 is a schematic diagram of a second intra coding mode set according to an embodiment of this disclosure.

In some embodiments, the coder side adds at least one horizontal angle prediction mode to the first intra prediction mode set to obtain a second intra prediction mode set, but this disclosure is not limited thereto. For example, as shown in FIG. 10, lines where a number 2 is located represent the added angle prediction modes. The added angle prediction modes are all horizontal angle prediction modes. A set formed by all angle prediction modes shown in FIG. 10 is the second intra prediction mode set. In some embodiments, the coder side may select one intra prediction mode from the second intra prediction mode set as the target intra prediction mode.

In some embodiments, a number of angle prediction modes added by the coder side is the same as or different from a number of angle prediction modes that are deleted.

It is to be understood that, after determining the target intra prediction mode, the coder side may use the target intra prediction mode to perform intra prediction to obtain the prediction information of the first image block. In some embodiments, the coder side may obtain a residual signal of the first image block according to an original signal and the prediction information of the first image block; transform the residual signal, and quantizes the transformed residual information, to obtain a transform and quantization coefficient; and perform entropy coding on the transform and quantization coefficient and indication information during the coding to obtain the bit stream.

In some embodiments, the coder side may perform the following transform operations on the residual signal to transform the residual signal into a transform domain, such as discrete Fourier transform (DFT) or discrete cosine transform (DCT), but this disclosure is not limited thereto. A lossy quantization operation is further performed on the signal in the transform domain, which loses a specific amount of information, so that the quantized signal facilitates compressed expression. Some video coding standards provide more than one transform manner for selection. Therefore, the coder side needs to select a transform manner for the first image block, and notify the decoder side of the selected transform manner through the above indication information. Fineness of quantization generally depends on a quantization parameter (QP). A larger QP indicates that coefficients within a larger value range are to be quantized into a same output, which causes larger distortion and a lower bit rate. On the contrary, a smaller QP indicates that coefficients within a smaller value range are to be quantized into a same output, which causes less distortion and a higher bit rate.

In some embodiments, statistical compression coding is performed on the quantized signal in the transform domain according to an occurrence frequency of each value, and finally a binarized (0 or 1) compressed bit stream is outputted. In addition, entropy coding is also required to be performed on other information generated during the coding, such as the selected intra prediction mode and a motion vector, to reduce a bit rate. The entropy coding is also referred to as statistical coding, which is a lossless coding manner that can effectively reduce a bit rate required for expressing a same signal. The statistical coding manner in this embodiment of this disclosure includes variable length coding (VLC) such as truncated unary coding or k-order exponential Golomb coding, or context adaptive binary arithmetic coding (CABAC).

To sum up, the technical solutions of the embodiments of this disclosure are performed on the image block in the ERP format corresponding to the to-be-coded image block in the 360-degree panoramic image. In a case that the image block in the ERP format is distorted, a string transverse correlation exists at the high latitude of the 360-degree panoramic image, that is to say, the image blocks at the same latitude have similar textures. Therefore, the coder side may delete partial angle prediction modes from the current intra prediction mode set. For example, in the HEVC standard, partial (i.e., some or all of) angle prediction modes with indexes greater than 18 may be deleted for image coding. Since the horizontal angle prediction modes are distributed more densely on the image block on the sphere closer to the top or the top, partial horizontal angle prediction modes may be deleted, or partial vertical angle prediction modes and partial horizontal angle prediction modes may be deleted. In conclusion, deleting the angle prediction modes is equivalent to deleting partial angle prediction modes in the to-be-coded image block distributed relatively densely. Since the dense distribution is not necessary for the to-be-coded image block or the image block in the ERP format, the technical solutions of the embodiments of this disclosure can improve the image coding efficiency.

For example, although a strong transverse correlation exists at the high latitude of the 360-degree panoramic image, that is, the image blocks at the same latitude have similar textures, the image blocks located at high latitudes but not at poles of the 360-degree panoramic image do not have a strong vertical correlation, that is, for the image blocks located at high latitudes but not at the poles of the 360-degree panoramic image, textures of image blocks at the same longitude are not similar, or even differ more greatly. Therefore, the coder side may add at least one horizontal angle prediction mode. These added angle prediction modes are applicable to different image textures. Therefore, the intra prediction is more accurate, thereby improving the effect of image coding.

As described above, the coder side may select one intra prediction mode from the first intra prediction mode set as the target intra prediction mode. Alternatively, at least one angle prediction mode is added to the first intra prediction mode set to obtain a second intra prediction mode set.

In some embodiments, the coder side may select one intra prediction mode from the second intra prediction mode set as the target intra prediction mode. Image coding for each of the two situations is described below.

It is assumed that the coder side selects one intra prediction mode from the first intra prediction mode set as the target intra prediction mode. First, during the entropy coding performed by the coder side, an index of the target intra prediction mode in the first intra prediction mode set may be carried in the indication information during the entropy coding. The coder side may determine the currently used intra prediction mode through the index, so that the decoder side can use the intra prediction mode to for intra prediction. Secondly, as mentioned above, in order to improve the coding efficiency of the intra prediction mode, the coder side may derive 3 MPMs of the first image block. Therefore, during the entropy coding, if the target intra prediction mode is in the MPMs, the indication information during the entropy coding is required to carry information used for indicating that the target intra prediction mode is in the MPMs, for example, carry "1" to indicate that the target intra prediction mode is in the MPMs. In some embodiments, the index of the target intra prediction mode in the MPMs is also carried. On the contrary, if the target intra prediction mode is not in the MPMs, the indication information during the entropy coding is required to carry information used for indicating that the target intra prediction mode is not in the MPMs, for example, carry "0" to indicate that the target intra prediction mode is not the MPMs. In this case, the indication information is required to carry an index of the target intra prediction mode in the first intra prediction mode set other than the MPMs.

It is to be understood that, as described in the above embodiment, the coder side deletes partial angle prediction modes from the current intra prediction mode set to obtain the first intra prediction mode set. That is to say, the intra prediction mode set is changed. Therefore, each of the MPMs is required to be adjusted. For example, the MPMs may be adjusted in any of the following manners, but this disclosure is not limited thereto.

(1) Updating a prediction mode in the original MPMs in a vertical direction to a prediction mode in a horizontal direction.

(2) Updating, to two intra prediction modes in the first intra prediction mode set adjacent to the intra prediction mode of the second image block, two intra prediction modes in the original MPMs adjacent to an intra prediction mode of a second image block, to obtain the updated MPMs. For example, two intra prediction modes in the original MPMs adjacent to an intra prediction mode of a second image block are replaced with two intra prediction modes in the second intra prediction mode set that are adjacent to the intra prediction mode of the second image block.

(3) Updating a prediction mode in the original MPMs in a vertical direction to a prediction mode in a horizontal direction, and updating, to two intra prediction modes in the first intra prediction mode set adjacent to the intra prediction mode of the second image block, two intra prediction modes in the original MPMs adjacent to an intra prediction mode of a second image block, to obtain the updated MPMs.

It is to be understood that the original MPMs are MPMs corresponding to the above current intra prediction mode set. For example, When the current intra prediction mode set is a set composed of the above 35 intra prediction modes, the original MPMs are the MPMs shown in Table 1.

The prediction mode in the original MPMs in the vertical direction is a V0 angle prediction mode, which is also referred to as an angle prediction mode with an index of 26, and the prediction mode in the original MPMs in the horizontal direction is an H0 angle prediction mode, which is also referred to as an angle prediction mode with an index of 10. Updating the prediction mode in the original MPMs in the vertical direction to the prediction mode in the horizontal direction is equivalent to deleting the prediction mode in the MPMs in the vertical direction. As described above, for the image block at the high latitude, deleting the prediction mode in the vertical direction has little effect on the image coding performance. In some embodiments, updating the prediction mode in the original MPMs in the vertical direction to the direction of the prediction mode in the horizontal direction is equivalent to adding a prediction mode in the horizontal direction. For the image blocks at the high latitudes but not at the poles, the textures of the image blocks differ greatly in the vertical direction. Therefore, adding the prediction mode in the horizontal direction can improve the effect of image coding.

It is to be understood that, $A^-$ and $A^+$ in the original MPMs are actually modes adjacent to a mode A. For example, as shown in FIG. 2, for the angle prediction mode with an index of 26, $A^-$ and $A^+$ are calculated by using the following formula (5):

$$A^- = 2 + ((A+29) \bmod 32)$$

$$A^+ = 2 + ((A-1) \bmod 32) \qquad (5).$$

$A^-=25$ and $A^+=27$ are obtained through the above formula (5). As shown in FIG. 2, the angle prediction modes with indexes of 25 and 27 are adjacent to the angle prediction mode with the index of 26.

Since the current intra prediction mode is adjusted in this embodiment of this disclosure, the modes adjacent to the mode A may change. Therefore, in this embodiment of this disclosure, the coder side may adjust $A^-$ and $A^+$ in the MPMs.

It is to be understood that the above second image block is an adjacent image block on the left of the first image block (that is, an image block corresponding to the mode A) or the adjacent image block above the first image block (that is, an image block corresponding to a mode B). The adjusted intra prediction mode set is the first intra prediction mode set, which actually means that the coder side updates the two intra prediction modes in the original MPMs adjacent to the intra prediction mode of the second image block to the two intra prediction modes in the first intra prediction mode set adjacent to the intra prediction mode of the second image block.

It is assumed that the coder side selects one intra prediction mode from the second intra prediction mode set as the target intra prediction mode. First, during the entropy coding performed by the coder side, the index of the target intra prediction mode in the second intra prediction mode set may be carried in the indication information during the entropy coding. The coder side may determine the currently used intra prediction mode through the index, so that the decoder side can use the intra prediction mode to for intra prediction. Secondly, as mentioned above, in order to improve the coding efficiency of the intra prediction mode, the coder side may derive 3 MPMs of the first image block. Therefore, during the entropy coding, if the target intra prediction mode is in the MPMs, the indication information during the entropy coding is required to carry information used for indicating that the target intra prediction mode is in the MPMs, for example, carry "1" to indicate that the target intra prediction mode is in the MPMs. In some embodiments, the index of the target intra prediction mode in the MPMs is also carried. On the contrary, if the target intra prediction mode is not in the MPMs, the indication information during the entropy coding is required to carry information used for indicating that the target intra prediction mode is not in the MPMs, for example, carry "0" to indicate that the target intra prediction mode is not the MPMs. In this case, the indication information is required to carry an index of the target intra prediction mode in the second intra prediction mode set other than the MPMs.

It is to be understood that, as described in the above embodiment, the coder side deletes partial angle prediction modes from the current intra prediction mode set to obtain the first intra prediction mode set, and adds the at least one angle prediction mode to the first intra prediction mode set to obtain the second intra prediction mode set. That is to say, the intra prediction mode set is changed. Therefore, each of the MPMs is required to be adjusted. For example, the MPMs may be adjusted in any of the following manners, but this disclosure is not limited thereto.

(1) Updating a prediction mode in the original MPMs in a vertical direction to a prediction mode in a horizontal direction.

(2) Updating, to two intra prediction modes in the second intra prediction mode set adjacent to the intra prediction mode of the second image block, two intra prediction modes in the original MPMs adjacent to an intra prediction mode of a second image block, to obtain the updated MPMs.

(3) Updating a prediction mode in the original MPMs in a vertical direction to a prediction mode in a horizontal direction, and updating, to two intra prediction modes in the second intra prediction mode set adjacent to the intra prediction mode of the second image block, two intra prediction modes in the original MPMs adjacent to an intra prediction mode of a second image block, to obtain the updated MPMs.

The original MPMs and updating the prediction mode in the original MPMs in the vertical direction to the prediction mode in the horizontal direction are similar to the above.

It is to be understood that, $A^-$ and $A^+$ in the original MPMs are actually modes adjacent to a mode A. For example, as shown in FIG. 2, corresponding to the angle prediction mode with the index of 26, $A^-$ and $A^+$ are calculated by using the following formula (6):

$$A^-=2+((A+29) \bmod 32)$$

$$A^+=2+((A-1) \bmod 32) \qquad (6).$$

$A^-25$ and $A^+=27$ are obtained through the above formula. As shown in FIG. 2, the angle prediction modes with indexes of 25 and 27 are adjacent to the angle prediction mode with the index of 26.

Since the current intra prediction mode is adjusted in this embodiment of this disclosure, the modes adjacent to the mode A may change. Therefore, the coder side may adjust $A^-$ and $A^+$ in the MPMs.

It is to be understood that the above second image block is an adjacent image block on the left of the first image block (that is, an image block corresponding to the mode A) or the adjacent image block above the first image block (that is, an image block corresponding to a mode B). The adjusted intra prediction mode set is the second intra prediction mode set, which actually means that the coder side updates the two intra prediction modes in the original MPMs adjacent to the intra prediction mode of the second image block to the two intra prediction modes in the second intra prediction mode set adjacent to the intra prediction mode of the second image block.

Exemplarily, assuming that the set composed of intra prediction modes currently shown in FIG. 10 is the above second intra prediction mode set, $A^-$ and $A^+$ in the updated MPMs are shown in Table 2 and Table 3:

TABLE 2

| | Index of intra prediction mode | | | | | | | | | | | | | | | | |
|---|---|---|---|---|---|---|---|---|---|---|---|---|---|---|---|---|---|
| A | 2 | 3 | 4 | 5 | 6 | 7 | 8 | 9 | 10 | 11 | 12 | 13 | 14 | 15 | 16 | 17 | 18 |
| $A^-$ | 32 | 2 | 3 | 4 | 5 | 33 | 31 | 29 | 27 | 25 | 23 | 21 | 19 | 14 | 15 | 16 | 17 |
| $A^+$ | 3 | 4 | 5 | 6 | 33 | 31 | 29 | 27 | 25 | 23 | 21 | 19 | 15 | 16 | 17 | 18 | 20 |

TABLE 3

| | Index of intra prediction mode | | | | | | | | | | | | | | | |
|---|---|---|---|---|---|---|---|---|---|---|---|---|---|---|---|---|
| A | 19 | 20 | 21 | 22 | 23 | 24 | 25 | 26 | 27 | 28 | 29 | 30 | 31 | 32 | 33 | 34 |
| A⁻ | 13 | 18 | 12 | 20 | 11 | 22 | 10 | 24 | 9 | 26 | 8 | 28 | 7 | 30 | 6 | 32 |
| A⁺ | 14 | 22 | 13 | 24 | 12 | 26 | 11 | 28 | 10 | 30 | 9 | 32 | 8 | 34 | 7 | 3 |

For example, as shown in Table 3, indexes of intra prediction modes adjacent to the intra prediction mode corresponding to the index of 26 are respectively 24 and 28, which conforms to the situation shown in FIG. 10.

In conclusion, in this embodiment of this disclosure, the coder side may adaptively perform coding according to the adjusted intra prediction mode set. In addition, if MPMs are used during the coding, the MPMs may be adaptively updated to ensure the accuracy of the image coding.

Figure 11:
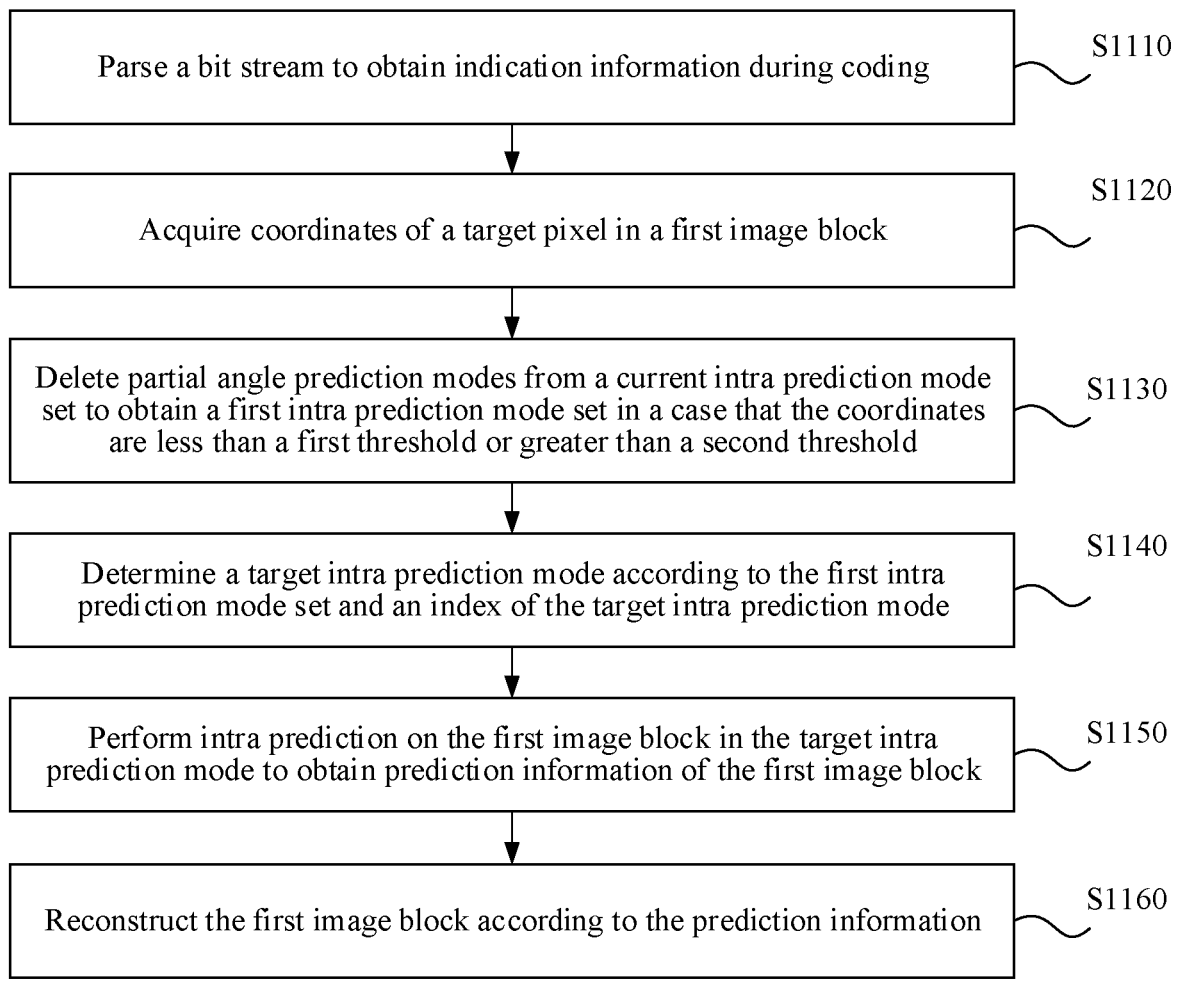
FIG. 11 is a flowchart of an image processing method according to an embodiment of this disclosure.

FIG. 11 is a flowchart of another image processing method according to an embodiment of this disclosure. The execution entity of the method may be the following device, but this disclosure is not limited thereto. An encoder is a device configured to perform video or image encoding, including a desktop computer, a mobile computing apparatus, a notebook (for example, laptop) computer, a tablet computer, a set-top box, a handset such as a smartphone, a television, a camera, a display apparatus, a digital media player, a video game console, an in-vehicle computer, or similar apparatuses. As shown in FIG. 11, the method includes the following steps:

S1110: Parse a bit stream to obtain indication information during coding, the indication information including an index of a target intra prediction mode.

S1120: Acquire coordinates of a target pixel in a first image block.

S1130: Delete partial angle prediction modes from a current intra prediction mode set to obtain a first intra prediction mode set in a case that the coordinates are less than a first threshold or greater than a second threshold. For example, when the latitude included in the coordinates is less than a first threshold or greater than a second threshold, one or more angle prediction modes are deleted from a current intra prediction mode set to obtain a first intra prediction mode set.

S1140: Determine the target intra prediction mode according to the first intra prediction mode set and the index of the target intra prediction mode.

S1150: Perform intra prediction on the first image block in the target intra prediction mode to obtain prediction information of the first image block.

S1160: Reconstruct the first image block according to the prediction information.

The first image block is an image block in an ERP format corresponding to a to-be-reconstructed image block in a 360-degree panoramic image. A first coordinate corresponds to a longitude of the 360-degree panoramic image, and a second coordinate corresponds to a latitude of the 360-degree panoramic image. The coordinates of the target pixel include the first coordinate and the second coordinate. When the second coordinate is less than the first threshold or the second coordinate is greater than the second threshold, partial angle prediction modes are deleted from the current intra prediction mode set to obtain the first intra prediction mode set. The first coordinate corresponds to a longitude of the 360-degree panoramic image, and the second coordinate corresponds to a latitude of the 360-degree panoramic image. For example, the first coordinate is a coordinate of the target pixel of the first image block on a u-axis in the u-v coordinate system shown in FIG. 7B, and the second coordinate is a coordinate on a v-axis of the target pixel of the first image block in the u-v coordinate system shown in FIG. 7B. Alternatively, the first coordinate is a coordinate of the to-be-coded image block on an m-axis in the m-n coordinate system shown in FIG. 7B, and the second coordinate is a coordinate of the to-be-coded image block on an n-axis in the m-n coordinate system shown in FIG. 7B.

In some embodiments, the target pixel may be any pixel in the first image block, for example, may be any one of but is not limited to an upper left corner pixel, a center pixel, an upper right corner pixel, a lower left corner pixel, or a lower right corner pixel in the first image block.

In some embodiments, the above first threshold and second threshold may be predetermined, or may be dynamically set. This is not limited in this embodiment of this disclosure.

In some embodiments, the coder side may select one intra prediction mode from the first intra prediction mode set as the target intra prediction mode. Alternatively, at least one angle prediction mode is added to the first intra prediction mode set to obtain a second intra prediction mode set.

In some embodiments, a decoder side adds at least one horizontal angle prediction mode to the first intra prediction mode set to obtain a second intra prediction mode set, but this disclosure is not limited thereto. In some embodiments, the decoder side may select one intra prediction mode from the second intra prediction mode set as the target intra prediction mode.

As described above, the decoder side may select one intra prediction mode from the first intra prediction mode set as the target intra prediction mode. Alternatively, at least one angle prediction mode is added to the first intra prediction mode set to obtain a second intra prediction mode set.

In some embodiments, the decoder side may select one intra prediction mode from the second intra prediction mode set as the target intra prediction mode. Image coding for each of the two situations is described below.

It is to be understood that, as described in the above embodiment, the decoder side deletes partial angle prediction modes from the current intra prediction mode set to obtain the first intra prediction mode set. That is to say, the intra prediction mode set is changed. Therefore, each of the MPMs is required to be adjusted. For example, the MPMs may be adjusted in any of the following manners, but this disclosure is not limited thereto.

(1) Updating a prediction mode in the original MPMs in a vertical direction to a prediction mode in a horizontal direction.

(2) Updating, to two intra prediction modes in the first intra prediction mode set adjacent to the intra prediction mode of the second image block, two intra prediction modes in the original MPMs adjacent to an intra prediction mode of a second image block, to obtain the updated MPMs.

(3) Updating a prediction mode in the original MPMs in a vertical direction to a prediction mode in a horizontal direction, and updating, to two intra prediction modes in the first intra prediction mode set adjacent to the intra prediction mode of the second image block, two intra prediction modes in the original MPMs adjacent to an intra prediction mode of a second image block, to obtain the updated MPMs.

It is to be understood that, as described in the above embodiment, the coder side deletes partial angle prediction modes from the current intra prediction mode set to obtain the first intra prediction mode set, and adds the at least one angle prediction mode to the first intra prediction mode set to obtain the second intra prediction mode set. That is to say, the intra prediction mode set is changed. Therefore, each of the MPMs is required to be adjusted. For example, the MPMs may be adjusted in any of the following manners, but this disclosure is not limited thereto.

(1) Updating a prediction mode in the original MPMs in a vertical direction to a prediction mode in a horizontal direction.

(2) Updating, to two intra prediction modes in the second intra prediction mode set adjacent to the intra prediction mode of the second image block, two intra prediction modes in the original MPMs adjacent to an intra prediction mode of a second image block, to obtain the updated MPMs.

(3) Updating a prediction mode in the original MPMs in a vertical direction to a prediction mode in a horizontal direction, and updating, to two intra prediction modes in the second intra prediction mode set adjacent to the intra prediction mode of the second image block, two intra prediction modes in the original MPMs adjacent to an intra prediction mode of a second image block, to obtain the updated MPMs.

It is to be understood that the decoder side corresponds to the coder side. Therefore, for a process of determining the first intra prediction mode set by the decoder side, refer to the content about the coder side.

In some embodiments, the decoder side may add at least one angle prediction mode to the first intra prediction mode set to obtain a second intra prediction mode set. For a process of determining the second intra prediction mode set, also refer to the content about the coder side.

It is to be understood that the decoder side may parse the obtained bit stream. The decoder side first performs entropy decoding on the bit stream to obtain a transform and quantization coefficient of the first image block, and then performs inverse quantization and inverse transformation on the transform and quantization coefficient to obtain a reconstructed residual signal of the first image block. The inverse quantization manner herein corresponds to the quantization manner of the coder side, and the inverse transform manner corresponds to the transform manner of the coder side. The decoder side may perform prediction on the first image block in the determined target intra prediction mode to obtain prediction information of the first image block. The decoder side adds up the prediction information and the reconstructed residual signal to obtain a reconstructed signal of the first image block, and then obtains a reconstructed image block corresponding to the first image block according to the reconstructed signal.

To sum up, the technical solutions of the embodiments of this disclosure are performed on the image block in the ERP format corresponding to the to-be-reconstructed image block in the 360-degree panoramic image. In a case that the ERP-format image block is distorted, a strong transverse correlation exists at the high latitude of the 360-degree panoramic image, that is to say, the image blocks at the same latitude have similar textures. Therefore, the decoder side may delete partial angle prediction modes from the current intra prediction mode set. For example, in the HEVC standard, the distribution of partial angle prediction modes with indexes greater than 18 may be deleted for image reconstruction. Since the horizontal angle prediction modes are distributed more densely on the image block on the sphere closer to the top or the top, partial horizontal angle prediction modes may be deleted, or partial vertical angle prediction modes and partial horizontal angle prediction modes may be deleted. In conclusion, deleting the angle prediction modes is equivalent to deleting partial angle prediction modes in the to-be-reconstructed image block distributed relatively densely. Since the dense distribution is not necessary for the to-be-reconstructed image block or the image block in the ERP format, the technical solutions of the embodiments of this disclosure can improve the image decoding efficiency.

In some embodiments, although a strong transverse correlation exists at the high latitude of the 360-degree panoramic image, that is, the image blocks at the same latitude have similar textures, the image blocks located at high latitudes but not at poles of the 360-degree panoramic image do not have a strong vertical correlation, that is, for the image blocks located at high latitudes but not at the poles of the 360-degree panoramic image, textures of image blocks at the same longitude are not similar, or even differ more greatly. Therefore, the decoder side may add at least one horizontal angle prediction mode. These added angle prediction modes are applicable to different image textures. Therefore, the intra prediction is more accurate, thereby improving the effect of image decoding.

Corresponding to the coder side, the index of the target intra prediction mode obtained by the decoder side by decoding may be the index of the target intra prediction mode in the first intra prediction mode set. Alternatively, if the decoder side parses the information indicating that the target intra prediction mode is in the MPMs, the index of the target intra prediction mode obtained by the decoder side by decoding may be the index of the target intra prediction mode in the MPMs. Alternatively, if the decoder side parses the information indicating that the target intra prediction mode is not in the MPMs, the index of the target intra prediction mode obtained by the decoder side by decoding may be the index of the target intra prediction mode in the first intra prediction mode set other than the MPMs. Alternatively, the index of the target intra prediction mode obtained by the decoder side by decoding may be the index of the target intra prediction mode in the second intra prediction mode set. Alternatively, if the decoder side parses the information indicating that the target intra prediction mode is in the MPMs, the index of the target intra prediction mode obtained by the decoder side by decoding may be the index of the target intra prediction mode in the MPMs. Alternatively, if the decoder side parses the information indicating that the target intra prediction mode is not in the MPMs, the index of the target intra prediction mode obtained by the decoder side by decoding may be the index of the target intra prediction mode in the second intra prediction mode set other than the MPMs.

It is to be understood that, the decoder side may alternatively update the original MPMs. For the updating of the original MPMs, refer to the corresponding content about the coder side.

In conclusion, in this embodiment of this disclosure, the decoder side may adaptively perform decoding according to the adjusted intra prediction mode set. In addition, if MPMs are used during the decoding, the MPMs may be adaptively updated to ensure the accuracy of the image decoding.

Figure 12:
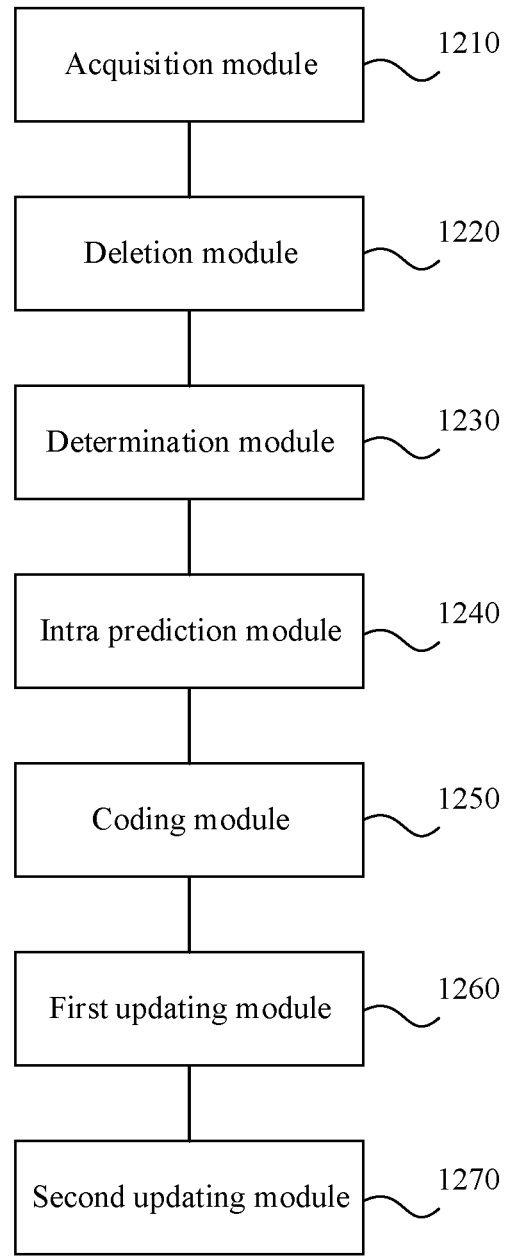
FIG. 12 is a schematic diagram of an image processing device according to an embodiment of this disclosure.

FIG. 12 is a schematic diagram of an image processing device according to an embodiment of this disclosure. As shown in FIG. 12, the device includes:

an acquisition module 1210, configured to acquire coordinates of a target pixel in a first image block, the first image block being an image block in an ERP format corresponding to a to-be-coded image block in a panoramic image, and the coordinates corresponding to a latitude of the panoramic image; a deletion module 1220, configured to delete partial angle prediction modes from a current intra prediction mode set to obtain a first intra prediction mode set in a case that the coordinates are less than a first threshold or greater than a second threshold; a determination module 1230, configured to determine a target intra prediction mode of the first image block according to the first intra prediction mode set; an intra prediction module 1240, configured to perform intra prediction on the first image block in the target intra prediction mode to obtain prediction information of the first image block; and a coding module 1250, configured to code the first image block according to the prediction information to obtain a bit stream.

In some embodiments, the determination module 1230 is further configured to: determine an intra prediction mode from the first intra prediction mode set, and using the intra prediction mode as the target intra prediction mode.

In some embodiments, the coding module 1250 is further configured to: obtain a residual signal according to an original signal and the prediction information of the first image block; transform the residual signal, and quantize the transformed residual information, to obtain a transform and quantization coefficient; and perform entropy coding on the transform and quantization coefficient and indication information during the coding to obtain the bit stream, the indication information including an index of the target intra prediction mode in the first intra prediction mode set.

In some embodiments, the device further includes: a first updating module 1260, configured to update MPMs corresponding to the current intra prediction mode set to obtain updated MPMs.

In some embodiments, the coding module 1250 is further configured to: obtain a residual signal according to an original signal and the prediction information of the first image block; transform the residual signal, and quantize the transformed residual information, to obtain a transform and quantization coefficient; and perform entropy coding on the transform and quantization coefficient and indication information during the coding to obtain the bit stream, the indication information including information for indicating that the target intra prediction mode is in the updated MPMs and an index of the target intra prediction mode in the updated MPMs; or the indication information including information for indicating that the target intra prediction mode is not in the updated MPMs and an index of the target intra prediction mode in the first intra prediction mode set other than the MPMs.

In some embodiments, the first updating module 1260 is further configured to: update a prediction mode in the original MPMs in a vertical direction to a prediction mode in a horizontal direction; or update, to two intra prediction modes in the first intra prediction mode set adjacent to the intra prediction mode of the second image block, two intra prediction modes in the original MPMs adjacent to an intra prediction mode of a second image block, to obtain the updated MPMs; or update a prediction mode in the original MPMs in a vertical direction to a prediction mode in a horizontal direction, and update, to two intra prediction modes in the first intra prediction mode set adjacent to the intra prediction mode of the second image block, two intra prediction modes in the original MPMs adjacent to an intra prediction mode of a second image block, to obtain the updated MPMs. the second image block being an adjacent image block on the left of or above the first image block.

In some embodiments, the determination module 1230 is further configured to: add at least one angle prediction mode to the first intra prediction mode set to obtain a second intra prediction mode set; and determine an intra prediction mode from the second intra prediction mode set, and using the intra prediction mode as the target intra prediction mode.

In some embodiments, the determination module 1230 is further configured to: add at least one horizontal angle prediction mode to the first intra prediction mode set to obtain the second intra prediction mode set.

In some embodiments, the coding module 1250 is further configured to: obtain a residual signal according to an original signal and the prediction information of the first image block; transform the residual signal, and quantize the transformed residual information, to obtain a transform and quantization coefficient; and perform entropy coding on the transform and quantization coefficient and indication information during the coding to obtain the bit stream, the indication information including an index of the target intra prediction mode in the second intra prediction mode set.

In some embodiments, the device further includes: a second updating module 1270, configured to update MPMs corresponding to the current intra prediction mode set to obtain updated MPMs.

In some embodiments, the coding module 1250 is further configured to: obtain a residual signal according to an original signal and the prediction information of the first image block; transform the residual signal, and quantize the transformed residual information, to obtain a transform and quantization coefficient; and perform entropy coding on the transform and quantization coefficient and indication information during the coding to obtain the bit stream, the indication information including information for indicating that the target intra prediction mode is in the updated MPMs and an index of the target intra prediction mode in the updated MPMs; or the indication information including information for indicating that the target intra prediction mode is not in the updated MPMs and an index of the target intra prediction mode in the second intra prediction mode set other than the MPMs.

In some embodiments, the second updating module 1270 is further configured to: update a prediction mode in the original MPMs in a vertical direction to a prediction mode in a horizontal direction; or update, to two intra prediction modes in the second intra prediction mode set adjacent to the intra prediction mode of the second image block, two intra prediction modes in the original MPMs adjacent to an intra prediction mode of a second image block, to obtain the updated MPMs; or update a prediction mode in the original MPMs in a vertical direction to a prediction mode in a horizontal direction, and update, to two intra prediction modes in the second intra prediction mode set adjacent to the intra prediction mode of the second image block, two intra prediction modes in the original MPMs adjacent to an intra prediction mode of a second image block, to obtain the updated MPMs. the second image block being an adjacent image block on the left of or above the first image block.

In some embodiments, the deletion module 1220 is further configured to: delete partial vertical angle prediction modes from the current intra prediction mode set to obtain a first intra prediction mode set; or delete partial horizontal angle prediction modes from the current intra prediction mode set to obtain a first intra prediction mode set; or delete partial horizontal angle prediction modes and partial vertical angle prediction modes from the current intra prediction mode set to obtain a first intra prediction mode set.

In some embodiments, the target pixel includes at least one of an upper left corner pixel, a center pixel, an upper right corner pixel, a lower left corner pixel, or a lower right corner pixel in the first image block.

It is to be understood that, the apparatus embodiment and the method embodiment may correspond to each other. For a similar description, reference may be made to the method embodiment. The image processing device shown in FIG. 12 may perform the method embodiment corresponding to FIG. 8, and the above and other operations and/or functions of the modules in the image processing device are intended to implement the corresponding processes in the methods in FIG. 8.

The image processing device in the embodiments of this disclosure is described above from the perspective of functional modules with reference to the accompanying drawings. It is to be understood that the functional modules may be implemented in a form of hardware, or may be implemented by instructions in a form of software, or may be implemented by a combination of hardware and software modules. The steps of the method embodiment in the embodiments of this disclosure may be completed by hardware integrated logic circuits in a processor and/or instructions in the form of software. The steps of the methods disclosed with reference to the embodiments of this disclosure may be directly performed and completed by a hardware decoding processor, or may be performed and completed by a combination of hardware and software modules in the decoding processor. In some embodiments, the software module may be located in a mature storage medium in the art, such as a random access memory, a flash memory, a read-only memory, a programmable read-only memory, an electrically-erasable programmable memory, or a register. The storage medium is located in the memory. The processor reads information in the memory and completes the steps of the method embodiments in combination with hardware thereof.

Figure 13:
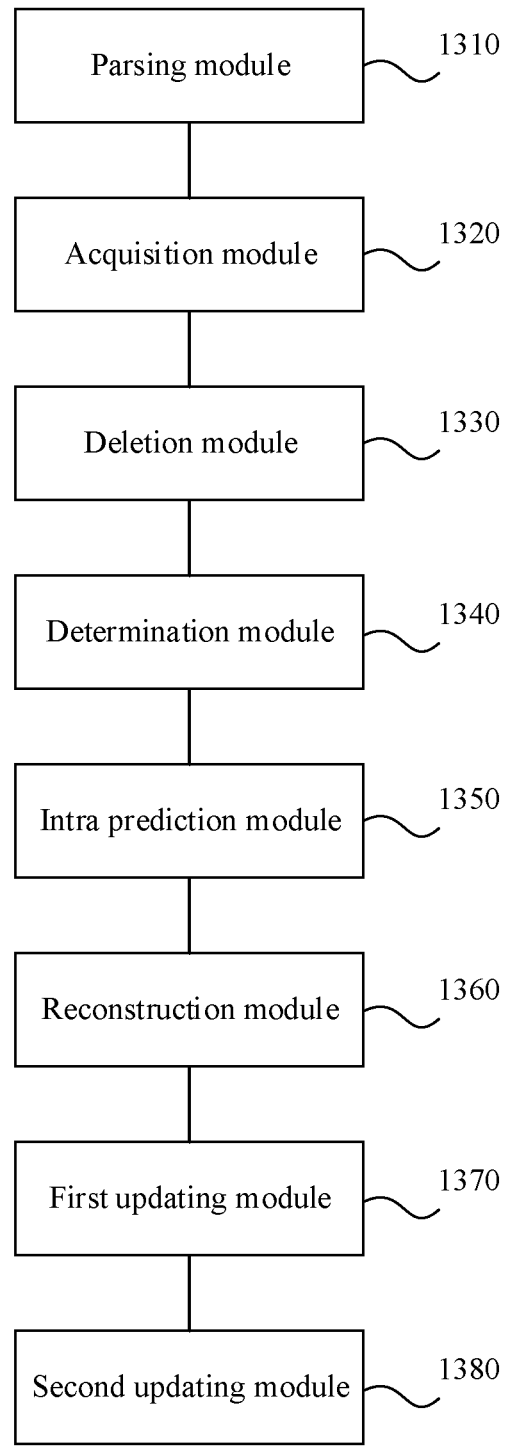
FIG. 13 is a schematic diagram of an image processing device according to an embodiment of this disclosure.

FIG. 13 is a schematic diagram of another image processing device according to an embodiment of this disclosure. As shown in FIG. 13, the device includes:

a parsing module 1310, configured to parse a bit stream to obtain indication information during coding, the indication information including an index of a target intra prediction mode; an acquisition module 1320, configured to acquire coordinates of a target pixel in a first image block, the first image block being an image block in an ERP format corresponding to a to-be-reconstructed image block in a panoramic image, and the coordinates corresponding to a latitude of the panoramic image; a deletion module 1330, configured to delete partial angle prediction modes from a current intra prediction mode set to obtain a first intra prediction mode set in a case that the coordinates are less than a first threshold or greater than a second threshold; a determination module 1340, configured to determine the target intra prediction mode according to the first intra prediction mode set and the index of the target intra prediction mode; an intra prediction module 1350, configured to perform intra prediction on the first image block in the target intra prediction mode to obtain prediction information of the first image block; and a reconstruction module 1360, configured to reconstruct the first image block according to the prediction information.

In some embodiments, the index of the target intra prediction mode is an index of the target intra prediction mode in the first intra prediction mode set.

In some embodiments, the device further includes: a first updating module 1370, configured to update MPMs corresponding to the current intra prediction mode set to obtain updated MPMs.

In some embodiments, the indication information further includes information for indicating that the target intra prediction mode is in the updated MPMs, the index of the target intra prediction mode being an index of the target intra prediction mode in the updated MPMs; or the indication information further includes information for indicating that the target intra prediction mode is not in the updated MPMs, the index of the target intra prediction mode being an index in the first intra prediction mode set other than the MPMs.

In some embodiments, the first updating module 1370 is further configured to: update a prediction mode in the original MPMs in a vertical direction to a prediction mode in a horizontal direction; or update, to two intra prediction modes in the first intra prediction mode set adjacent to the intra prediction mode of the second image block, two intra prediction modes in the original MPMs adjacent to an intra prediction mode of a second image block, to obtain the updated MPMs; or update a prediction mode in the original MPMs in a vertical direction to a prediction mode in a horizontal direction, and update, to two intra prediction modes in the first intra prediction mode set adjacent to the intra prediction mode of the second image block, two intra prediction modes in the original MPMs adjacent to an intra prediction mode of a second image block, to obtain the updated MPMs. the second image block being an adjacent image block on the left of or above the first image block.

In some embodiments, the determination module 1340 is further configured to: add at least one angle prediction mode to the first intra prediction mode set to obtain a second intra prediction mode set; and determine the target intra prediction mode according to the second intra prediction mode set and the index of the target intra prediction mode.

In some embodiments, the index of the target intra prediction mode is an index of the target intra prediction mode in the second intra prediction mode set.

In some embodiments, the device further includes: a second updating module 1380, configured to update MPMs corresponding to the current intra prediction mode set to obtain updated MPMs.

In some embodiments, the indication information further includes information for indicating that the target intra prediction mode is in the updated MPMs, the index of the target intra prediction mode being an index of the target intra prediction mode in the updated MPMs; or the indication information further includes information for indicating that the target intra prediction mode is not in the updated MPMs, the index of the target intra prediction mode being an index in the second intra prediction mode set other than the MPMs.

In some embodiments, the second updating module 1380 is further configured to: update a prediction mode in the original MPMs in a vertical direction to a prediction mode in a horizontal direction; or update, to two intra prediction modes in the second intra prediction mode set adjacent to the intra prediction mode of the second image block, two intra prediction modes in the original MPMs adjacent to an intra prediction mode of a second image block, to obtain the updated MPMs; or update a prediction mode in the original MPMs in a vertical direction to a prediction mode in a horizontal direction, and update, to two intra prediction modes in the second intra prediction mode set adjacent to the intra prediction mode of the second image block, two intra prediction modes in the original MPMs adjacent to an intra prediction mode of a second image block, to obtain the updated MPMs, the second image block being an adjacent image block on the left of or above the first image block.

In some embodiments, the deletion module 1330 is further configured to: delete partial vertical angle prediction modes from the current intra prediction mode set to obtain a first intra prediction mode set; or delete partial horizontal angle prediction modes from the current intra prediction mode set to obtain a first intra prediction mode set; or delete partial horizontal angle prediction modes and partial vertical angle prediction modes from the current intra prediction mode set to obtain a first intra prediction mode set.

In some embodiments, the target pixel includes at least one of an upper left corner pixel, a center pixel, an upper right corner pixel, a lower left corner pixel, or a lower right corner pixel in the first image block.

It is to be understood that the device embodiment may correspond to the method embodiment, and for similar descriptions, refer to the method embodiment. The image processing device shown in FIG. 13 may perform the method embodiment corresponding to FIG. 11, and the above and other operations and/or functions of the modules in the image processing device are intended to implement the corresponding processes in the methods in FIG. 11.

The image processing device in the embodiments of this disclosure is described above from the perspective of functional modules with reference to the accompanying drawings. It is to be understood that the functional modules may be implemented in a form of hardware, or may be implemented by instructions in a form of software, or may be implemented by a combination of hardware and software modules. The steps of the method embodiment in the embodiments of this disclosure may be completed by hardware integrated logic circuits in a processor (e.g., processing circuitry) and/or instructions in the form of software. The steps of the methods disclosed with reference to the embodiments of this disclosure may be directly performed and completed by a hardware decoding processor, or may be performed and completed by a combination of hardware and software modules in the decoding processor. In some embodiments, the software module may be located in a non-transitory storage medium in the art, such as a random access memory, a flash memory, a read-only memory, a programmable read-only memory, an electrically-erasable programmable memory, or a register. The storage medium is located in the memory. The processor reads information in the memory and completes the steps of the method embodiments in combination with hardware thereof.

An embodiment of this disclosure further provides an image processing device. The device may be configured to perform the method embodiment corresponding to FIG. 8. The device may be a coder or a device for video or image coding, for example, a handheld device such as a desktop computer, a mobile computing device, a notebook computer (for example, a laptop computer), a tablet computer, a set-top box, or a smartphone, a television, a camera, a display device, a digital media player, a video game console, an on-board computer, or other similar image processing devices. If the device is the other image processing devices, the device may include a coder, a display, a memory, and the like. The coder is mainly configured to perform the method embodiment corresponding to FIG. 8.

An embodiment of this disclosure further provides an image processing device. The device may be configured to perform the method embodiment corresponding to FIG. 11. The device may be a decoder or a device for video or image coding, for example, a handheld device such as a desktop computer, a mobile computing device, a notebook computer (for example, a laptop computer), a tablet computer, a set-top box, or a smartphone, a television, a camera, a display device, a digital media player, a video game console, an on-board computer, or other similar image processing devices. If the device is the other image processing devices, the device may include a decoder, a display, a memory, and the like. The decoder is mainly configured to perform the method embodiment corresponding to FIG. 11.

In this embodiment of this disclosure, the memory includes, but is not limited to:

a non-volatile memory and/or a volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, DRAM), and a direct rambus random access memory (Direct Rambus RAM, RAM).

In this embodiment of this disclosure, a computer program may be divided into one or more modules, and the one or more modules are stored in the memory and executed by a processor to complete the methods provided in the embodiments of this disclosure. The one or more modules may be a series of computer program instruction segments that can implement specific functions. The instruction segments are used for describing an execution process of the computer program in the image processing device.

An embodiment of this disclosure further provides a computer storage medium, where the computer storage medium stores a computer program, and the computer program, when executed by a computer, causes the computer to perform the method in the foregoing method embodiments. Alternatively, an embodiment of this disclosure further provides a computer program product including instructions, the instructions, when executed by a computer, cause the computer to perform the method in the foregoing method embodiments.

When the software is used for implementation, all or some of the embodiments may be implemented in a form of a computer program product. The computer program product includes one or more computer instructions. When the computer program instructions are loaded and executed on the computer, the procedures or functions according to the embodiments of this disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The available medium may be a magnetic medium (such as a floppy disk, a hard disk, or a magnetic tape), an optical medium (such as a digital video disc (DVD)), a semiconductor medium (such as a solid state disk (SSD)) or the like.

In an embodiment, a non-transitory computer-readable storage medium stores computer-readable instructions which, when executed by a computer device, cause the computer device to perform an image processing method that includes acquiring coordinates of a pixel in a first image block, the first image block being an image block in an equirectangular projection (ERP) format corresponding to an image block in a panoramic image. The coordinates include a latitude of the panoramic image. The method further includes, when the latitude included in the coordinates is less than a first threshold or greater than a second threshold, deleting one or more angle prediction modes from a current intra prediction mode set to obtain a first intra prediction mode set. The method further includes determining a target intra prediction mode of the first image block according to the first intra prediction mode set, and performing intra prediction on the first image block using the target intra prediction mode to obtain prediction information of the first image block. The method further includes coding the first image block according to the prediction information to obtain a bit stream.

In an embodiment, a non-transitory computer-readable storage medium stores computer-readable instructions which, when executed by a computer device, cause the computer device to perform an image processing method that includes parsing a bit stream to obtain indication information, the indication information comprising an index of a target intra prediction mode, and acquiring coordinates of a pixel in a first image block. The first image block is an image block in an equirectangular projection (ERP) format corresponding to an image block in a panoramic image to be reconstructed, and the coordinates include a latitude of the panoramic image. The method further includes, when the latitude included in the coordinates is less than a first threshold or greater than a second threshold, deleting one or more angle prediction modes from a current intra prediction mode set to obtain a first intra prediction mode set. The method further includes determining the target intra prediction mode according to the first intra prediction mode set and the index of the target intra prediction mode, and performing intra prediction on the first image block using the target intra prediction mode to obtain prediction information of the first image block. The method further includes reconstructing the first image block according to the prediction information.

A person of ordinary skill in the art may be aware that, in combination with the examples described in the embodiments disclosed in this specification, modules and algorithm steps may be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application.

In the several embodiments provided in this disclosure, it is to be understood that the disclosed system, apparatus, and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network units. A part or all of the modules may be selected according to actual requirements to achieve the objectives of the solutions of the embodiments of this disclosure. For example, functional modules in the embodiments of this disclosure may be integrated into one processing module, or each of the modules may exist alone physically, or two or more modules are integrated into one module.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. An image processing method, comprising:
    acquiring coordinates of a pixel in a first image block, the first image block being an image block in an equirectangular projection (ERP) format corresponding to an image block in a panoramic image, and the coordinates include a latitude of the panoramic image;
    when the latitude included in the coordinates is less than a first threshold or greater than a second threshold, deleting one or more angle prediction modes from a current intra prediction mode set to obtain a first intra prediction mode set;
    determining a target intra prediction mode of the first image block according to the first intra prediction mode set;
    performing intra prediction on the first image block using the target intra prediction mode to obtain prediction information of the first image block;
    updating a prediction mode of original most probable modes (MPMs) corresponding to the current intra prediction mode set in a vertical direction to a prediction mode in a horizontal direction; and
    coding the first image block according to the prediction information to obtain a bit stream.

2. The method according to claim 1, wherein the determining comprises:

determining an intra prediction mode from the first intra prediction mode set, and using the intra prediction mode as the target intra prediction mode.

3. The method according to claim 2, wherein the coding comprises:
obtaining a residual signal according to an original signal and the prediction information of the first image block;
transforming the residual signal, and quantizing the transformed residual signal, to obtain a transform and quantization coefficient; and
performing entropy coding on the transform and quantization coefficient and indication information to obtain the bit stream,
the indication information comprising an index of the target intra prediction mode in the first intra prediction mode set.

4. The method according to claim 1, wherein the coding comprises:
obtaining a residual signal according to an original signal and the prediction information of the first image block;
transforming the residual signal, and quantizing the transformed residual signal, to obtain a transform and quantization coefficient; and
performing entropy coding on the transform and quantization coefficient and indication information to obtain the bit stream,
the indication information (i) indicating that the target intra prediction mode is in the updated MPMs and including an index of the target intra prediction mode in the updated MPMs, or (ii) indicating that the target intra prediction mode is not in the updated MPMs and including an index of the target intra prediction mode in the first intra prediction mode set.

5. The method according to claim 1, wherein the updating comprises:
replacing two intra prediction modes in the original MPMs adjacent to an intra prediction mode of a second image block with two intra prediction modes in the first intra prediction mode set that are adjacent to the intra prediction mode of the second image block, the second image block being an adjacent image block on a left of or above the first image block.

6. The method according to claim 1, wherein the determining comprises:
adding at least one angle prediction mode to the first intra prediction mode set to obtain a second intra prediction mode set; and
determining an intra prediction mode from the second intra prediction mode set, and using the intra prediction mode as the target intra prediction mode.

7. The method according to claim 6, wherein the adding comprises:
adding at least one horizontal angle prediction mode to the first intra prediction mode set to obtain the second intra prediction mode set.

8. The method according to claim 6, wherein the coding comprises:
obtaining a residual signal according to an original signal and the prediction information of the first image block;
transforming the residual signal, and quantizing the transformed residual signal, to obtain a transform and quantization coefficient; and
performing entropy coding on the transform and quantization coefficient and indication information to obtain the bit stream,
the indication information comprising an index of the target intra prediction mode in the second intra prediction mode set.

9. The method according to claim 6, wherein the coding comprises:
obtaining a residual signal according to an original signal and the prediction information of the first image block;
transforming the residual signal, and quantizing the transformed residual signal, to obtain a transform and quantization coefficient; and
performing entropy coding on the transform and quantization coefficient and indication information to obtain the bit stream,
the indication information (i) indicating that the target intra prediction mode is in the updated MPMs and including an index of the target intra prediction mode in the updated MPMs, or (ii) indicating that the target intra prediction mode is not in the updated MPMs and including an index of the target intra prediction mode in the second intra prediction mode set.

10. The method according to claim 6, wherein the updating comprises:
replacing two intra prediction modes in the original MPMs adjacent to an intra prediction mode of a second image block with two intra prediction modes in the second intra prediction mode set that are adjacent to the intra prediction mode of the second image block, the second image block being an adjacent image block on a left of or above the first image block.

11. The method according to claim 1, wherein the deleting comprises:
performing at least one of:
deleting part or all of vertical angle prediction modes from the current intra prediction mode set; or
deleting part or all of horizontal angle prediction modes from the current intra prediction mode set.

12. The method according to claim 1, wherein the pixel comprises at least one of an upper left corner pixel, a center pixel, an upper right corner pixel, a lower left corner pixel, or a lower right corner pixel in the first image block.

13. An image processing method, comprising:
parsing a bit stream to obtain indication information, the indication information comprising an index of a target intra prediction mode;
acquiring coordinates of a pixel in a first image block, the first image block being an image block in an equirectangular projection (ERP) format corresponding to an image block in a panoramic image to be reconstructed, and the coordinates include a latitude of the panoramic image;
when the latitude included in the coordinates is less than a first threshold or greater than a second threshold, deleting one or more angle prediction modes from a current intra prediction mode set to obtain a first intra prediction mode set;
determining the target intra prediction mode according to the first intra prediction mode set and the index of the target intra prediction mode;
performing intra prediction on the first image block using the target intra prediction mode to obtain prediction information of the first image block;
updating a prediction mode of original most probable modes (MPMs) corresponding to the current intra prediction mode set in a vertical direction to a prediction mode in a horizontal direction; and
reconstructing the first image block according to the prediction information.

14. The method according to claim 13, wherein the index of the target intra prediction mode is an index of the target intra prediction mode in the first intra prediction mode set.

15. The method according to claim 13, wherein
the indication information further indicates that the target intra prediction mode is in the updated MPMs, the index of the target intra prediction mode being an index of the target intra prediction mode in the updated MPMs; or
the indication information further indicates that the target intra prediction mode is not in the updated MPMs, the index of the target intra prediction mode being an index in the first intra prediction mode set.

16. The method according to claim 13, wherein the updating comprises:
replacing two intra prediction modes in the original MPMs adjacent to an intra prediction mode of a second image block with two intra prediction modes in the first intra prediction mode set that are adjacent to the intra prediction mode of the second image block, the second image block being an adjacent image block on a left of or above the first image block.

17. An image processing apparatus, comprising:
processing circuitry configured to
acquire coordinates of a pixel in a first image block, the first image block being an image block in an equirectangular projection (ERP) format corresponding to an image block in a panoramic image, and the coordinates include a latitude of the panoramic image;
when the latitude included in the coordinates is less than a first threshold or greater than a second threshold, delete one or more angle prediction modes from a current intra prediction mode set to obtain a first intra prediction mode set;
determine a target intra prediction mode of the first image block according to the first intra prediction mode set;
perform intra prediction on the first image block using the target intra prediction mode to obtain prediction information of the first image block;
update a prediction mode of original most probable modes (MPMs) corresponding to the current intra prediction mode set in a vertical direction to a prediction mode in a horizontal direction; and
code the first image block according to the prediction information to obtain a bit stream.

* * * * *